(12) United States Patent
Burns et al.

(10) Patent No.: US 12,002,190 B2
(45) Date of Patent: Jun. 4, 2024

(54) PRIMITIVE TESTING FOR RAY INTERSECTION AT MULTIPLE PRECISIONS

(71) Applicant: Apple Inc., Cupertino, CA (US)

(72) Inventors: Christopher A. Burns, Austin, TX (US); Casper R. W. van Benthem, Abbots Langley (GB)

(73) Assignee: Apple Inc., Cupertino, CA (US)

( * ) Notice: Subject to any disclaimer, the term of this patent is extended or adjusted under 35 U.S.C. 154(b) by 613 days.

(21) Appl. No.: 17/136,542

(22) Filed: Dec. 29, 2020

(65) Prior Publication Data

US 2022/0207690 A1 Jun. 30, 2022

(51) Int. Cl.
*G06T 15/06* (2011.01)
*G06T 1/20* (2006.01)
(Continued)

(52) U.S. Cl.
CPC .............. *G06T 7/0002* (2013.01); *G06T 1/20* (2013.01); *G06T 15/005* (2013.01); *G06T 15/06* (2013.01);
(Continued)

(58) Field of Classification Search
CPC ... G06T 15/06; G06T 2210/21; G06T 15/005; G06T 1/20; G06T 15/08; G06T 2210/12;
(Continued)

(56) References Cited

U.S. PATENT DOCUMENTS 8,237,711 B2 * 8/2012 McCombe .............. G06T 15/06
345/418
8,411,088 B2 * 4/2013 Sevastianov ............ G06T 15/06
345/426
(Continued)

FOREIGN PATENT DOCUMENTS

GB 2584187 A 11/2020

OTHER PUBLICATIONS

International Search Report and Written Opinion in PCT Appl. No. PCT/US2021/063017 dated Apr. 12, 2022, 13 pages.
(Continued)

*Primary Examiner* — Ian L Lemieux
*Assistant Examiner* — Woo C Rhim
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to testing whether a ray intersects a graphics primitive, e.g., for ray tracing. In some embodiments, intersection circuitry performs a reduced-precision conservative intersection test and shader circuitry performs an original-precision intersection test if the intersection circuitry indicates a hit. The intersection circuitry may quantize the ray (and may quantize the primitive or may receive a quantized representation of the primitive) and generates a potential error value based on propagation of quantization error for the primitive and ray. The intersection circuitry then determines an intersection result for the reduced-precision test based on the quantized primitive data and the potential error. In various embodiments, disclosed techniques may improve performance or reduce power consumption by reducing the number of original-precision intersection tests that do not result in hits.

20 Claims, 14 Drawing Sheets

(51) Int. Cl.
  *G06T 7/00* (2017.01)
  *G06T 15/00* (2011.01)
  *G06T 17/10* (2006.01)
(52) U.S. Cl.
  CPC .... *G06T 17/10* (2013.01); *G06T 2207/20224* (2013.01)
(58) Field of Classification Search
  CPC .................. G06T 7/0002; G06T 17/10; G06T 2207/20224
  See application file for complete search history.

(56) References Cited

U.S. PATENT DOCUMENTS

| | | | | |
|---|---|---|---|---|
| 9,858,704 | B2* | 1/2018 | Vaidyanathan | G06T 15/06 |
| 9,928,640 | B2* | 3/2018 | Woop | G06T 15/06 |
| 9,990,761 | B1* | 6/2018 | Anderson | G06T 17/20 |
| 10,580,195 | B2* | 3/2020 | Stanard | G06T 15/50 |
| 2008/0100617 | A1* | 5/2008 | Keller | G06T 15/50 345/421 |
| 2009/0167763 | A1* | 7/2009 | Waechter | G06T 15/40 345/426 |
| 2009/0244058 | A1* | 10/2009 | Purcell | G06T 15/06 345/418 |
| 2017/0178387 | A1* | 6/2017 | Woop | G06T 15/08 |
| 2017/0287203 | A1* | 10/2017 | Vaidyanathan | G06T 15/06 |
| 2020/0051314 | A1* | 2/2020 | Laine | G06T 15/06 |
| 2020/0211261 | A1* | 7/2020 | Janus | G06T 17/005 |
| 2020/0264888 | A1* | 8/2020 | Limaye | G06F 9/3834 |
| 2020/0320776 | A1* | 10/2020 | Doyle | G06T 15/10 |
| 2021/0097750 | A1* | 4/2021 | Woop | G06T 15/06 |
| 2021/0192829 | A1* | 6/2021 | Clark | G06T 15/06 |
| 2021/0287428 | A1* | 9/2021 | Woop | G06T 15/06 |
| 2021/0287429 | A1* | 9/2021 | Vaidyanathan | G06F 7/24 |
| 2021/0390760 | A1* | 12/2021 | Muthler | G06T 15/005 |
| 2023/0084570 | A1* | 3/2023 | Muthler | G06T 17/20 345/426 |

OTHER PUBLICATIONS

Sven Woop et al., "Watertight Ray/Triangle Intersection," Journal of Computer Graphics Techniques, vol. 2, No. 1, Jun. 28, 2013, pp. 65-82.

Krishna Rajan et al., "Dual-precision fixed-point arithmetic for low-power ray-triangle intersections," Computers and Graphics vol. 87, Feb. 1, 2020, pp. 72-79.

S. Keely, "Reduced Precision for Hardware Ray Tracing in GPUs," Eurographics/ACM SIGGRAPH Symposium of High Performance Graphics, Jun. 23-25, 2014, pp. 29-40.

Seok Joong Hwang et al., "A mobile ray tracing engine with hybrid number representations," SA'15 Symposium on MGIA, Nov. 2, 2015, 4 pages.

* cited by examiner

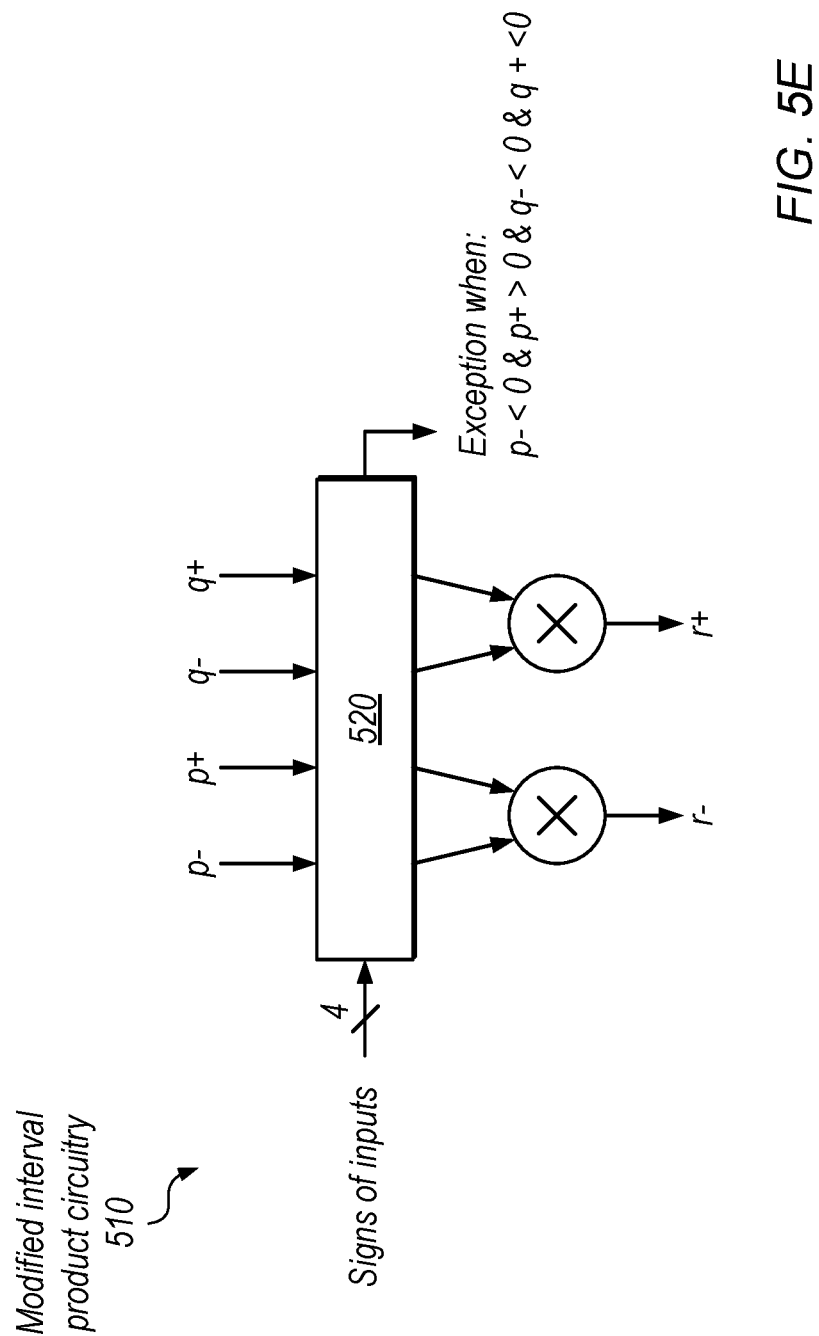

PRIMITIVE TESTING FOR RAY INTERSECTION AT MULTIPLE PRECISIONS

BACKGROUND

Technical Field

This disclosure relates generally to graphics processors and more particularly to primitive intersection testing for ray tracing.

Description of the Related Art

In computer graphics, ray tracing is a rendering technique for generating an image by tracing the path of light as pixels in an image plane and simulating the effects of its encounters with virtual objects. Ray tracing may allow resolution of visibility in three dimensions between any two points in the scene, which is also the source of most of its computational expense. A typical ray tracer samples paths of light through the scene in the reverse direction of light propagation, starting from the camera and propagating into the scene, rather than from the light sources (this is sometimes referred to as "backward ray tracing"). Starting from the camera has the benefit of only tracing rays which are visible to the camera. This system can model a rasterizer, in which rays simply stop at the first surface and invoke a shader (analogous to a fragment shader) to compute a color. More commonly secondary effects—in which the exchange of illumination between scene elements, such as diffuse inter-reflection and transmission—are also modeled. Shaders that evaluate surface reflective properties may invoke further intersection queries (e.g., generate new rays) to capture incoming illumination from other surfaces. This recursive process has many formulations, but is commonly referred to as path tracing.

Graphics processors that implement ray tracing typically provide more realistic scenes and lighting effects, relative to traditional rasterization systems. Ray tracing is typically computationally expensive, however. Improvements to ray tracing techniques may improve realism in graphics scenes, improve performance (e.g., allow tracing of more rays per frame, tracing in more complex scenes, or both), reduce power consumption (which may be particularly important in battery-powered devices), etc.

BRIEF DESCRIPTION OF THE DRAWINGS

FIGS. 5A-5E are circuit diagrams illustrating detailed example reduced-precision triangle test circuitry used to implement blocks of FIG. 4, according to some embodiments.

DETAILED DESCRIPTION

Figure 1A:
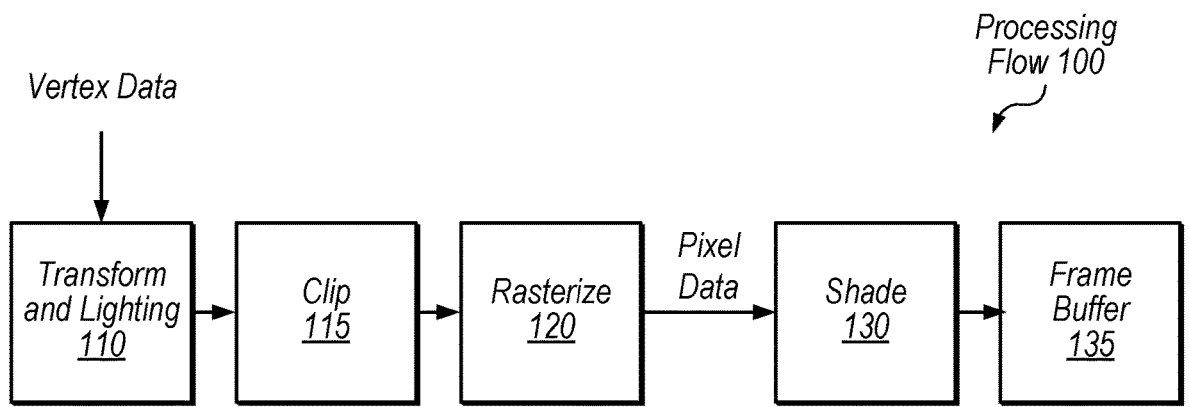
FIG. 1A is a diagram illustrating an overview of example graphics processing operations, according to some embodiments.
Figure 1B:
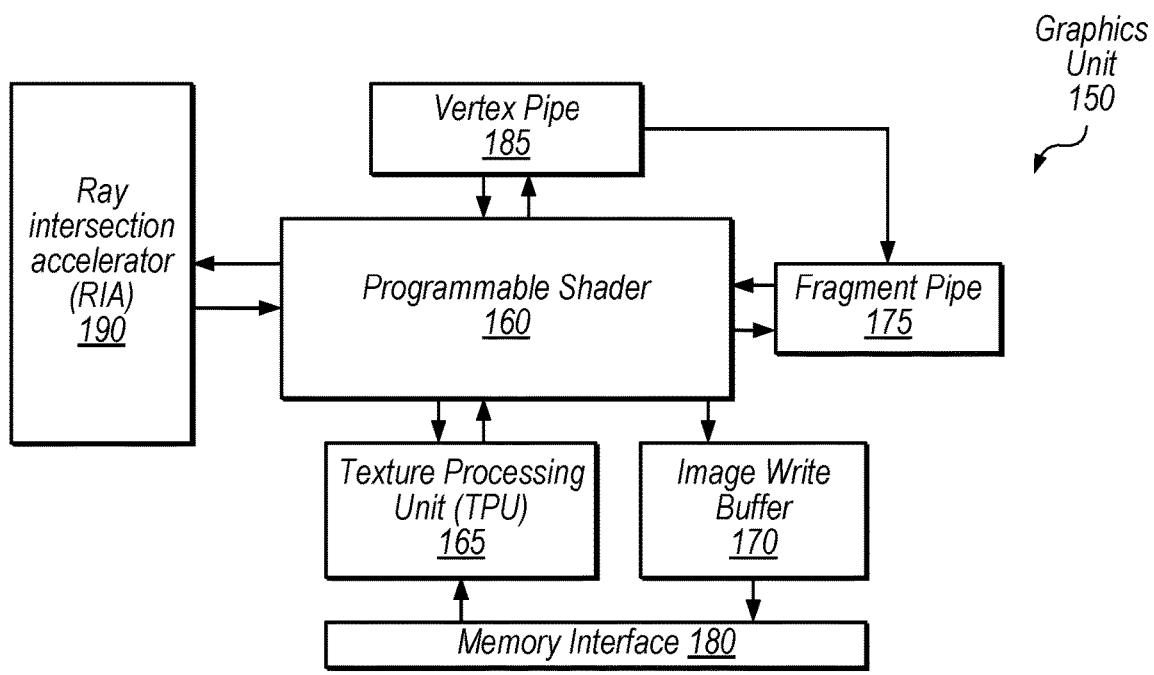
FIG. 1B is a block diagram illustrating an example graphics unit, according to some embodiments.
Figure 8:
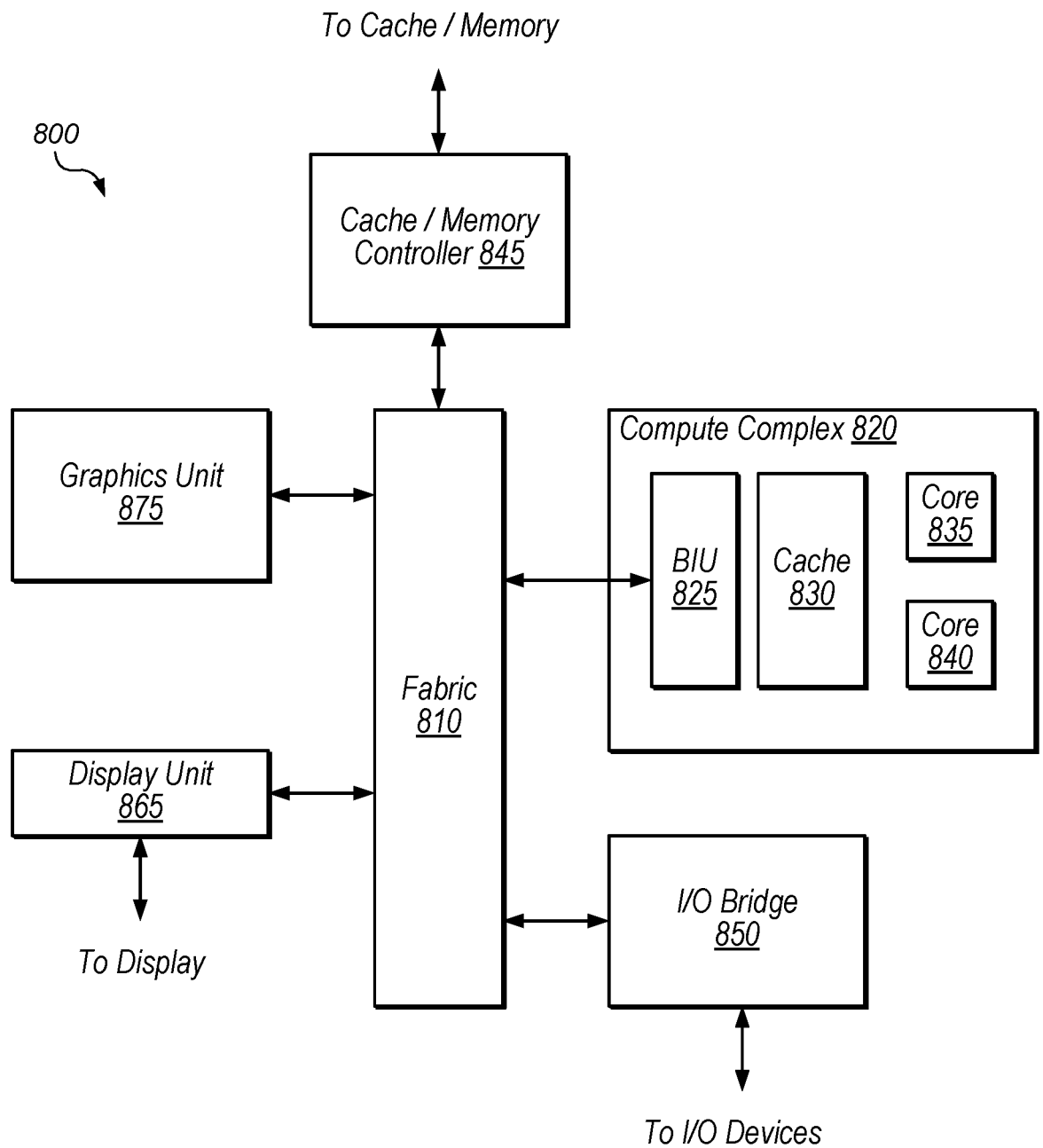
FIG. 8 is a block diagram illustrating an example computing device, according to some embodiments.
Figure 9:
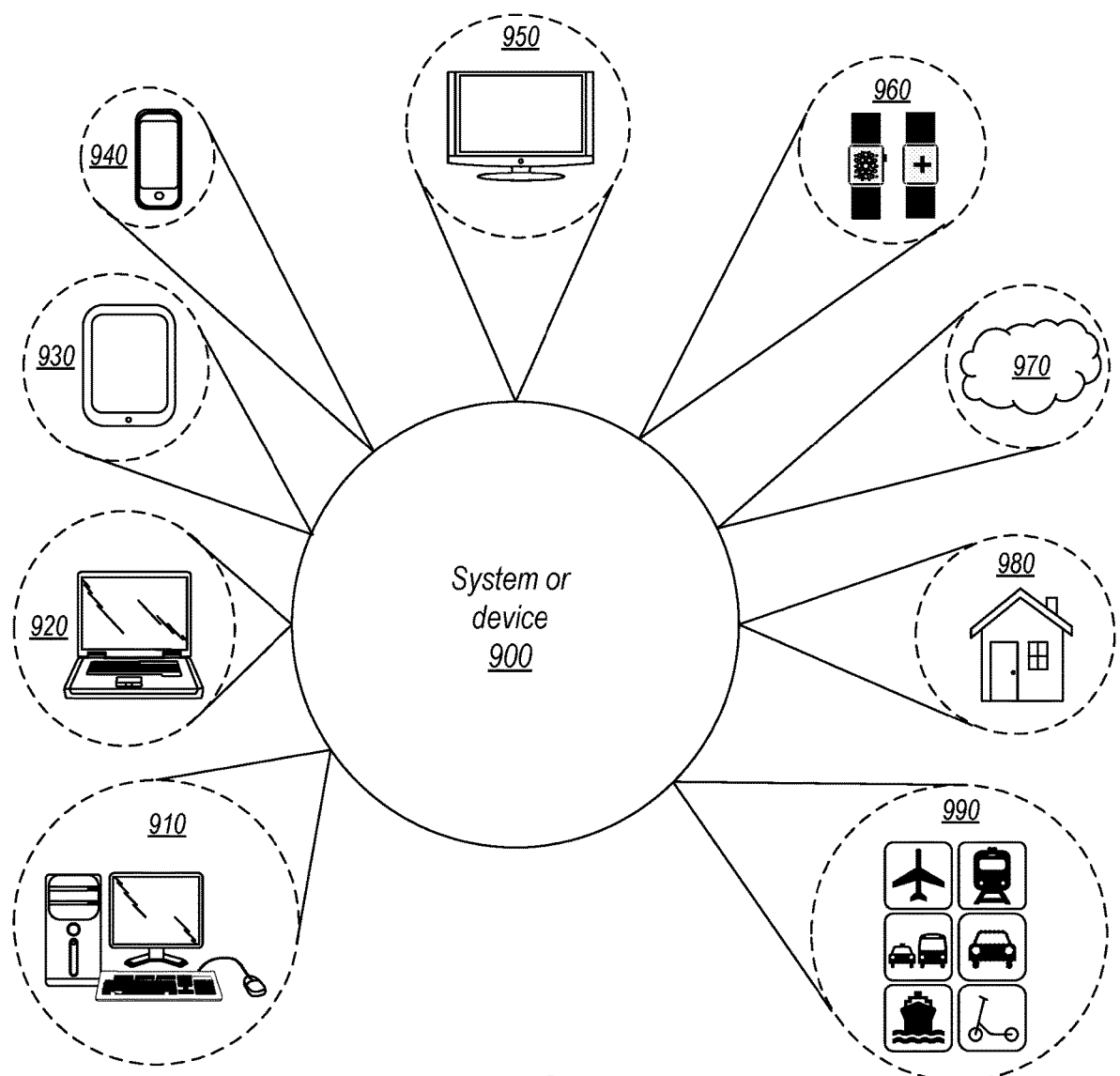
FIG. 9 is a diagram illustrating example applications of disclosed systems and devices, according to some embodiments.
Figure 10:
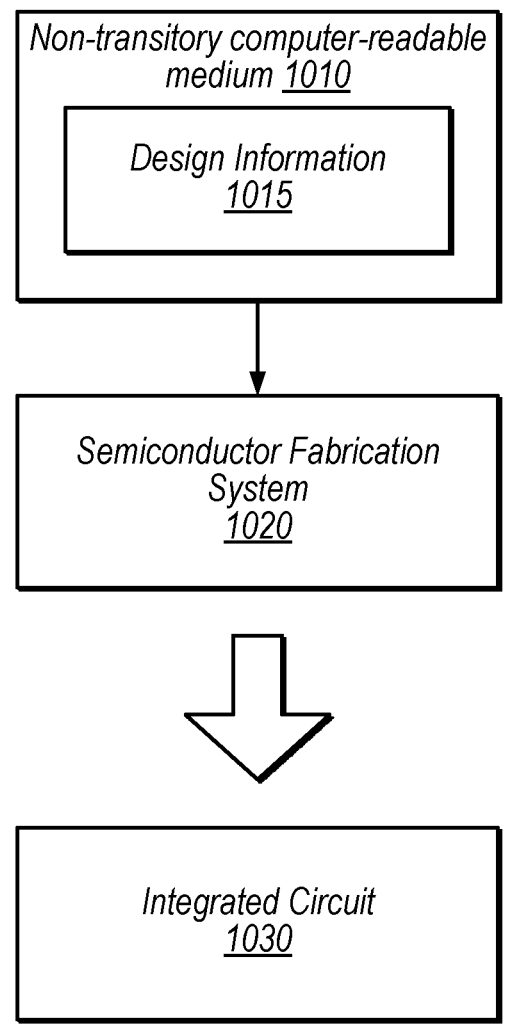
FIG. 10 is a block diagram illustrating an example computer-readable medium that stores circuit design information, according to some embodiments.

This disclosure provides various examples of a graphics processor configured to perform a reduced-precision ray-primitive intersect test prior to a higher-precision intersect test. FIGS. 1A-1B provide an overview of a graphics processor. FIGS. 2-7 provide example techniques for performing intersect tests at multiple precisions. FIGS. 8-10 provide example computing devices, systems, and circuit design information.

Graphics Processing Overview

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write unit 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

In the illustrated example, graphics unit 150 includes ray intersection accelerator (RIA) 190, which may include hardware configured to perform various ray intersection operations, as described in detail below.

Ray Tracing Overview

Ray tracing techniques typically sample paths of light through a graphics scene in the reverse direction of light propagation, starting from the camera and propagating into the scene, rather than from the light sources (this is sometimes referred to as "backward ray tracing"). A ray may be defined using an origin (O), a direction (D), and a parametric interval (T) defining the active portion of the ray. Thus, a ray may be thought of as a line segment. A graphics processor may perform various queries for a given ray. For example, a "closest hit" query may locate the nearest intersected geometry along a ray and within the parametric interval (this may be the most common type of query). An "any hit" query may locate any intersected geometry along the ray and within the parametric interval. This type of query may be used for shadow rays, for example, to determine whether a point in the scene has direct visibility to a light source or is occluded. Once intersected geometry has been determined, that geometry may be shaded based on the intersections, and may in turn generate more rays for intersection testing, e.g., from reflective surfaces.

Ray intersection calculations are often facilitated by acceleration data structures (ADS). To efficiently implement ray intersection queries, a spatial data structure may reduce the number of ray-surface intersection tests and thereby accelerate the query process. A common class of ADS is the bounding volume hierarchy (BVH) in which surface primitives are enclosed in a hierarchy of geometric proxy volumes (e.g., boxes) that are cheaper to test for intersection. These volumes may be referred to as bounding regions. By traversing the data structure and performing proxy intersection tests along the way, the graphics processor locates a conservative set of candidate intersection primitives for a given ray. A common form of BVH uses 3D Axis-Aligned Bounding Boxes (AABB). Once constructed, an AABB BVH may be used for all ray queries, and is a viewpoint-independent structure. In some embodiments, these structures are constructed once for each distinct mesh in a scene, in the local object space or model space of that object, and rays are transformed from world-space into the local space before traversing the BVH.

Typically, once a leaf node in the ADS is reached, the graphics processor performs an intersection test for one or more primitives associated with that leaf. Testing a primitive (e.g., a triangle) may be more computationally intensive than testing bounding boxes.

Overview of Primitive Testing Using Multiple Precisions

Even using bounding volume techniques, the number of primitives traditionally tested for intersection may still be much larger than the number of actual intersections. Speaking generally, reducing intersection tests may advantageously improve utilization of processing resources and improve overall performance. Therefore, in disclosed embodiments, one or more reduced-precision primitive tests are performed prior to more computationally-expensive tests, which may reduce overall computational expense.

In some embodiments, a reduced-precision hardware primitive test is performed (e.g., by ray intersection accelerator 190) while a shader program performs higher-precision tests (e.g., executed by programmable shader 160). In response to hits from the reduced-precision test, the higher-precision test is initiated to determine if there is actually a hit and to precisely resolve the spatial location of the hit. In other embodiments, dedicated circuitry may perform the higher-precision test rather than executing a shader program.

The reduced-precision test may be a conservative test, where the term "conservative" means that the test can generate false hits but is guaranteed not to generate false misses. Therefore, if there is a miss for the reduced-precision test, the device may skip the higher-precision test to reduce shader workload. Although hardware and software (e.g., shader) tests are discussed herein for purposes of illustration, other embodiments are contemplated (e.g., performing both reduced-precision and higher-precision tests in hardware or performing both types of tests in shaders). Further, while embodiments with tests at two precisions are discussed herein, additional tests at other precisions are contemplated (e.g., two lower-precision tests at different precisions followed by an original-precision test).

In some embodiments, the reduced-precision primitive test circuitry first quantizes the ray coordinates to generate a reduced-precision representation. Primitive coordinates may also be quantized or may have previously been quantized and stored, e.g., during construction of an acceleration data structure. The reduced-precision primitive test may calculate a potential error introduced by quantization, and then perform an intersection test (e.g., edge tests for a triangle) with the error as an input operand to produce a conservative intersection result. The error may be calculated as a bound to account for propagation of numerical rounding errors through various intersection operations. Determining and considering a potential error may be advantageous relative to other approaches in terms of computational complexity, power consumption, or the number of units for full precision triangle tests to achieve a given performance target. Further, due to the reduced-precision nature of the initial test, the hardware may have low area and power requirements relative to custom hardware for an original-precision test.

Figure 2:
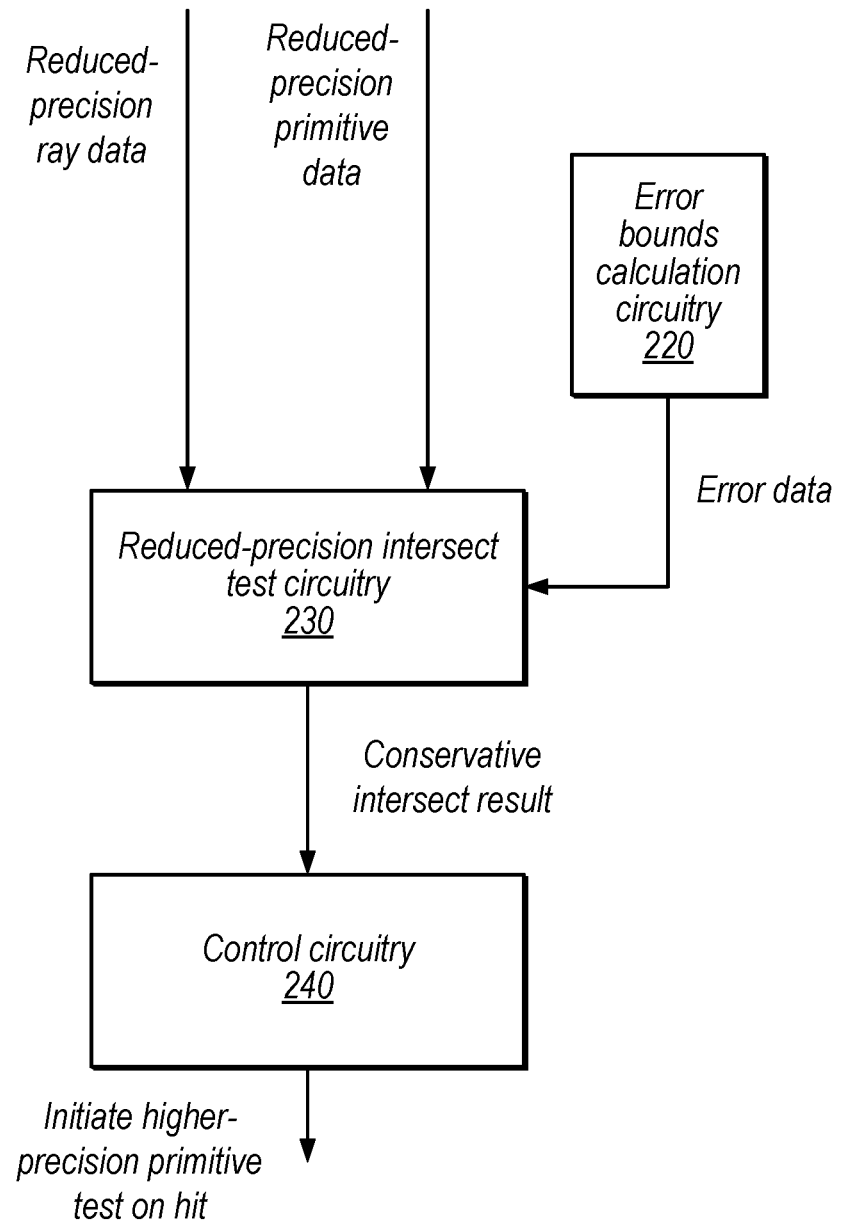
FIG. 2 is a block diagram illustrating example circuitry configured to perform a reduced-precision intersection test, according to some embodiments.

FIG. 2 is a block diagram illustrating example circuitry configured to perform a reduced-precision intersection test, according to some embodiments. In the illustrated example, the device includes error bounds calculation circuitry 220, reduced-precision intersect test circuitry 230, and control circuitry 240. In some embodiments, RIA 190 includes the circuitry of FIG. 2.

Error bounds calculation circuitry 220, in some embodiments, is configured to determine the greatest possible error introduced by quantization of the ray and primitive (e.g., where the quantization generated the reduced-precision ray and primitive data). Note that this error may be an approximation, but it may a conservative approximation such that it cannot be smaller than the actual greatest possible error. As discussed in detail below, error bounds calculation circuitry 220 may receive various input data such as shear factors, differences in a coordinate (e.g., the z coordinate) between the ray and primitive, ray information, etc.

Reduced-precision intersect test circuitry 230, in the illustrated embodiment, is configured to perform an intersection test based on the error data, reduced-precision primitive data, and reduced-precision ray data to produce a conservative intersect result. Control circuitry 240, in the illustrated embodiment, is configured to initiate a higher-precision primitive test in response to a hit indicated by the conservative intersect result. For example, RIA 190 may generate a clique-T (a type of SIMD group) to execute a shader program on programmable shader 160 to perform a higher-precision intersect test, as discussed in U.S. patent application Ser. No. 17/103,433 filed on Nov. 24, 2020, which is incorporated by reference herein in its entirety.

In various embodiments, one or more intersection tests are performed by shader circuitry configured to execute SIMD groups, e.g., to test multiple rays in parallel, to test a ray against multiple primitives, or both. The term "SIMD group" is intended to be interpreted according to its well-understood meaning, which includes a set of threads for which processing hardware processes the same instruction in parallel using different input data for the different threads. Various types of computer processors may include sets of pipelines configured to execute SIMD instructions. For example, graphics processors often include programmable shader cores that are configured to execute instructions for a set of related threads in a SIMD fashion. Other examples of names often used for a SIMD group include: a wavefront, a clique, or a warp. A SIMD group may be a part of a larger thread group, which may be broken up into a number of SIMD groups based on the parallel processing capabilities of a computer. In some embodiments, each thread is assigned to a hardware pipeline that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

Figure 3:
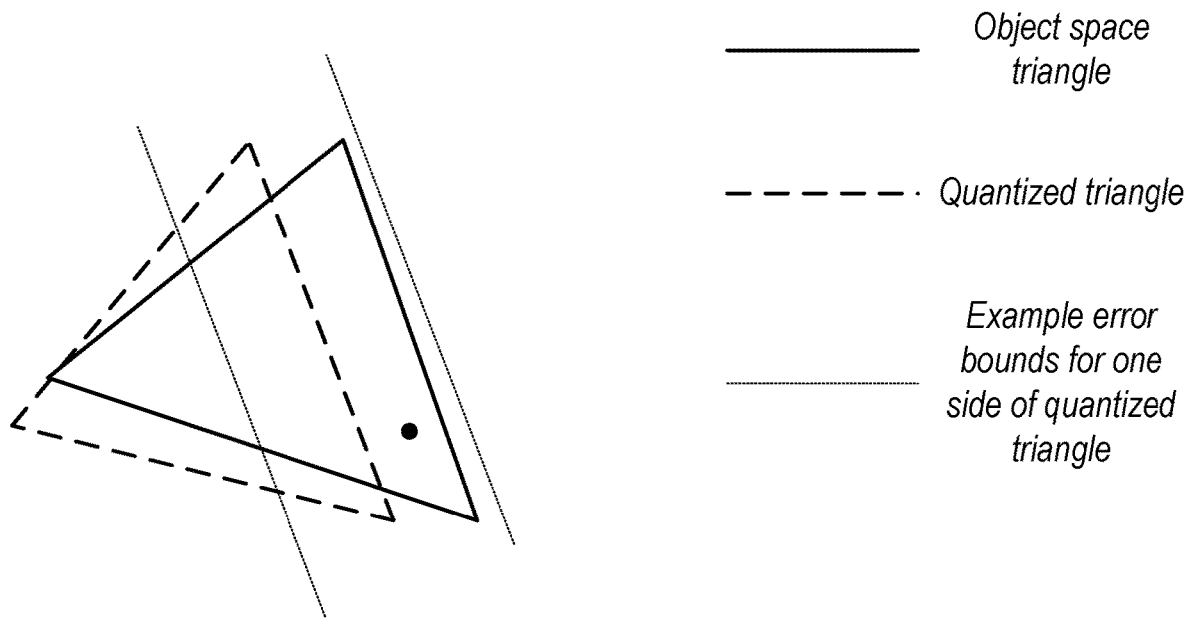
FIG. 3 is a diagram illustrating an example triangle, ray, and quantized representation of the triangle in object space, according to some embodiments.

FIG. 3 is a diagram illustrating an example triangle, ray, and quantized representation of the triangle, according to some embodiments. FIG. 3 is a two-dimensional simplified figure representing a three-dimensional space. In the illustrated example, the dot represents the ray as if looking down the ray; thus FIG. 3 is shown from the point of view of a given ray. As shown, the quantized representation of the triangle (represented after a shear transformation) approximates the location of the original triangle but does not cover the original triangle.

The two parallel dashed lines, in the illustrated embodiment, represent example error bounds for one edge of the quantized triangle (error bounds associated with other edges are not shown). As shown, the error bounds are sufficient to cover the corresponding edge (and both corresponding vertices) of the original triangle from the point of view of the ray. The reduced-precision intersection test circuitry 230 of FIG. 2 may consider this error bounds to generate a conservative result, as discussed in further detail below. For example, circuitry 230 may appropriately add or subtract the error from primitive coordinates in conjunction with edge tests. In some embodiments, Q bits are used to represent quantized primitive vertices using a round-to-zero operation. In some embodiments, to provide symmetric error bounds, an implied 0.1 on the quantized value is used to change the error to plus or minus 0.5 units of least precision.

Detailed Example Reduced-Precision Intersect Test Circuitry

Figure 4:
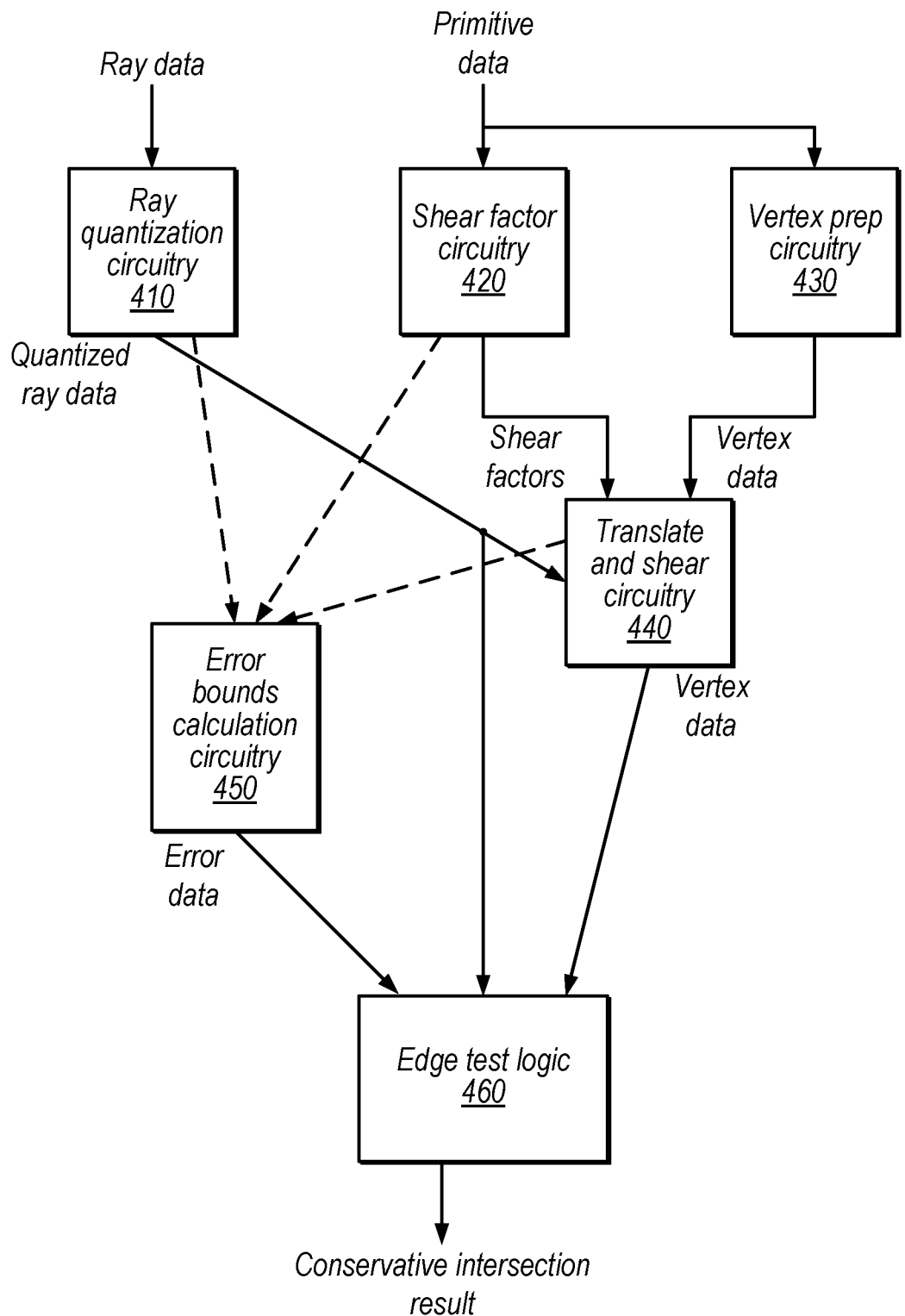
FIG. 4 is a block diagram illustrating more detailed reduced-precision intersect test circuitry, according to some embodiments.

FIG. 4 is a block diagram illustrating more detailed reduced-precision intersect test circuitry, according to some embodiments. In the illustrated example, the device includes ray quantization circuitry 410, shear factor circuitry 420, vertex prep circuitry 430, translate and shear circuitry 440, error bounds calculation circuitry 450, and edge test logic 460.

Note that FIGS. 5A-5E are diagrams illustrating detailed example reduced-precision triangle test circuitry used to implement blocks of FIG. 4 and various example operations represented using equations and pseudocode below, according to some embodiments. Therefore, reference will be made to FIGS. 5A-5E in the following discussion.

In example embodiments discussed below, the low precision ray triangle intersector rejects triangles by performing low precision fixed-point edge tests. The endpoints of the ray are not considered, and a successful test indicates that a full precision test is needed. First the ray origin is recomputed at a location near the representable region of the quantization frame. The ray origin and direction are then both transformed into the quantization coordinate frame, where they are converted to fixed-point values. Then, the axis with the largest-magnitude ray direction is identified and the coordinates for all Cartesian inputs are renamed. The intersector then shears the triangle into a new coordinate frame in which the ray originates at the origin and is pointing in the positive unit Z axis by construction. In this space, the intersector performs six low precision 2D edge tests—three rounding "outwards" assuming we are viewing the front face of the triangle, and three rounding "inwards." This result can reject the triangle from further consideration. If the ray passes either set of edges tests (front or back), there is a substantially greater chance that a watertight ray-triangle test at the original precision will report a hit for a given triangle, relative to performing the original-precision test without an initial low-precision test.

Arithmetic up to the point of conversion to fixed-point encodings may be floating-point and subject to rounding errors. Instead of employing conservative rounding directions throughout using conventional interval arithmetic, disclosed techniques may use nearest-rounding, and separately derive conservative error bounds for the sequence of operations. This error for each fixed-point input is then propagated through to the final comparison operators and accumulated into the inputs to ensure the 2D edge tests are geometrically conservative. This may ensure that no geometrically intersected triangle is rejected.

In some embodiments, the disclosed techniques are performed in conjunction with an original-precision triangle test that uses the same axis renaming and shear transform strategy, replicating a similar sequence of operations except with higher precision.

Ray quantization circuitry 410, in some embodiments, is configured to quantize ray information. The circuitry on the left-hand size of FIG. 5A that generates coordinates for the ray origin in fixed-point quantization space is one example of ray quantization circuitry 410. In this example, the ray quantization circuitry 410 includes a fused multiply add (FMA) circuit, a subtractor, exponent circuitry, float-to-fixed-point conversion circuitry (float2fix with round to nearest RTN), circuitry to find the coordinate in which the ray has the greatest magnitude (the circuitry with the "max" function), and axis rename circuitry. As with other formats discussed herein, note that various appropriate formats may be used to represent the quantized ray.

Figure 5A:
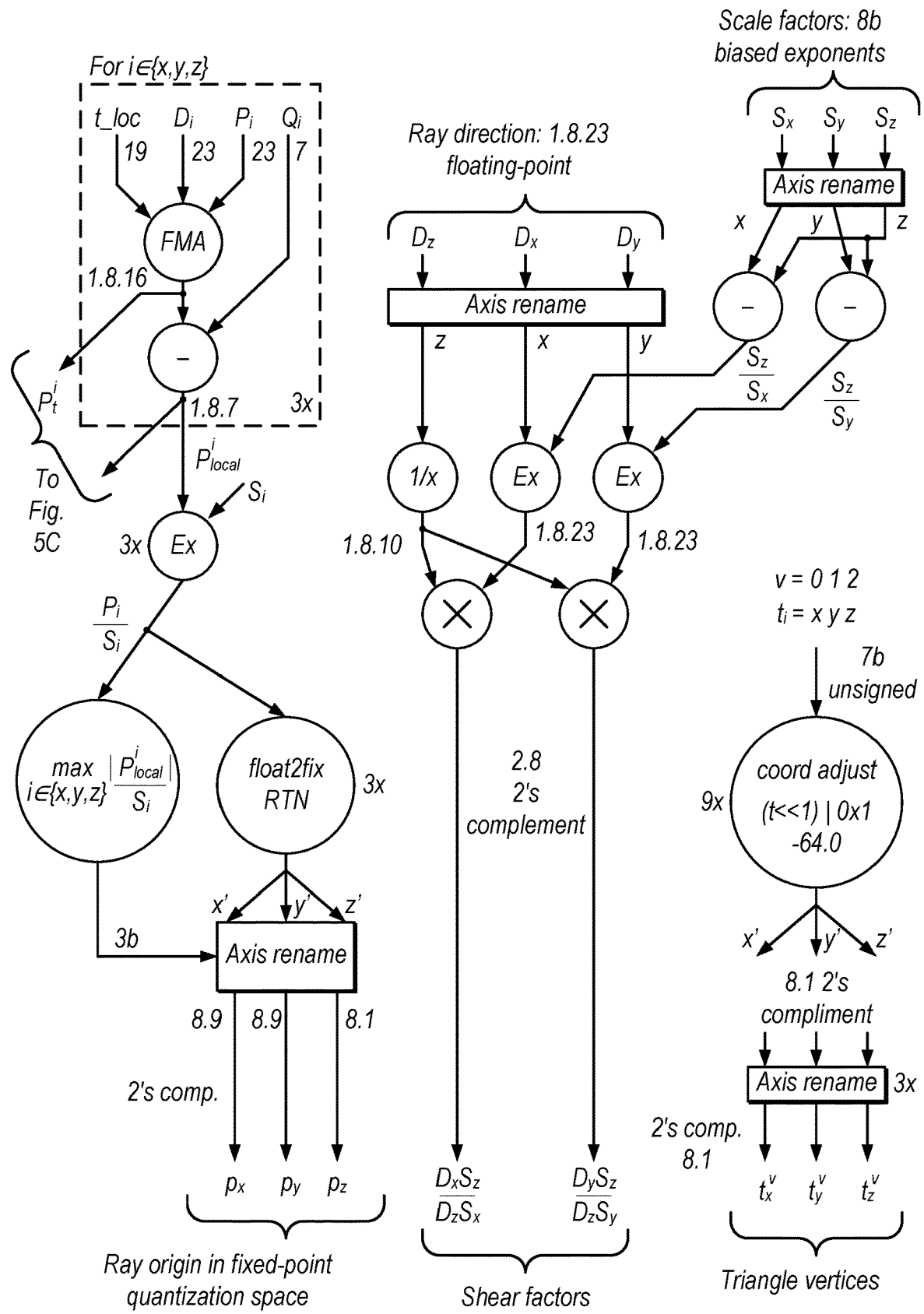

Shear factor circuitry 420, in some embodiments, is configured to generate shear factors to transform vertex coordinates into a shared two-dimensional coordinate frame. FIG. 5A provides one example of such circuitry configured to generate shear factors. In this example, shear factor circuitry 420 includes axis rename circuitry, subtract circuitry, exponent circuitry, reciprocal circuitry, and multiplier circuitry.

Vertex prep circuitry 430, in some embodiments, is configured to adjust coordinates and potentially rename axes. The right-hand circuitry of FIG. 5A configured to generate triangle vertices is one example of such circuitry. In this example, the vertex prep circuitry 430 includes coordinate adjust circuitry and axis rename circuitry.

Figure 5B:
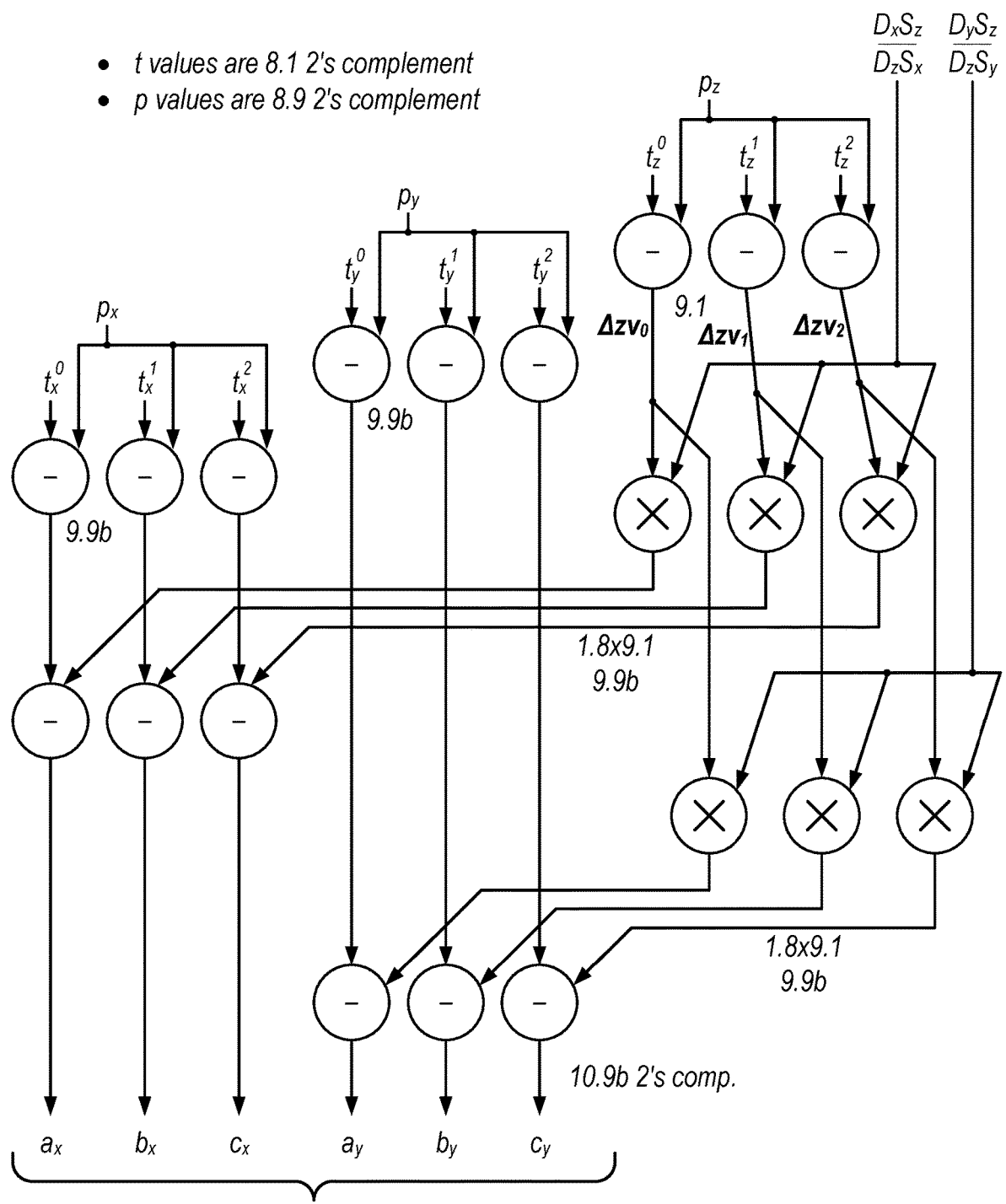

Translate and shear circuitry 440, in some embodiments, is configured to generate translated and sheared triangle vertices based on the shear factors, prepared vertices, and the shear factors. FIG. 5B provides one example of such circuitry. In this example, translate and shear circuitry 440 includes subtract and multiplier circuitry.

Figure 5C:
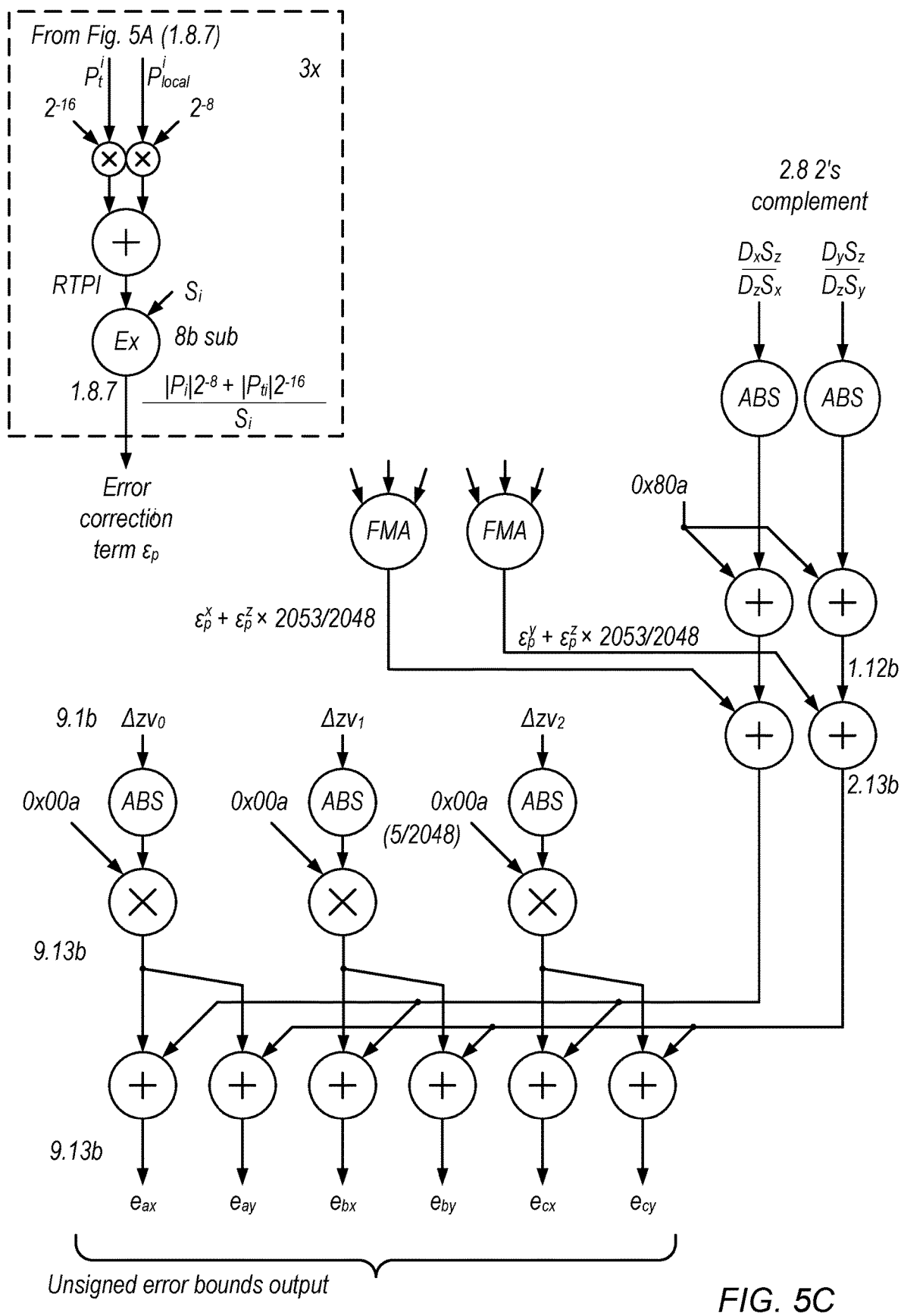

Error bounds calculation circuitry 450, in some embodiments, is configured to generate error bounds based on data from circuitry 410, 420, and 440 (e.g., origin coordinates, shear factors, and delta z values). FIG. 5C provides one example of such circuitry. In this example, error bounds calculation circuitry includes multiplier circuitry FMA circuitry, exponent circuitry, and adder circuitry.

Figure 5D:
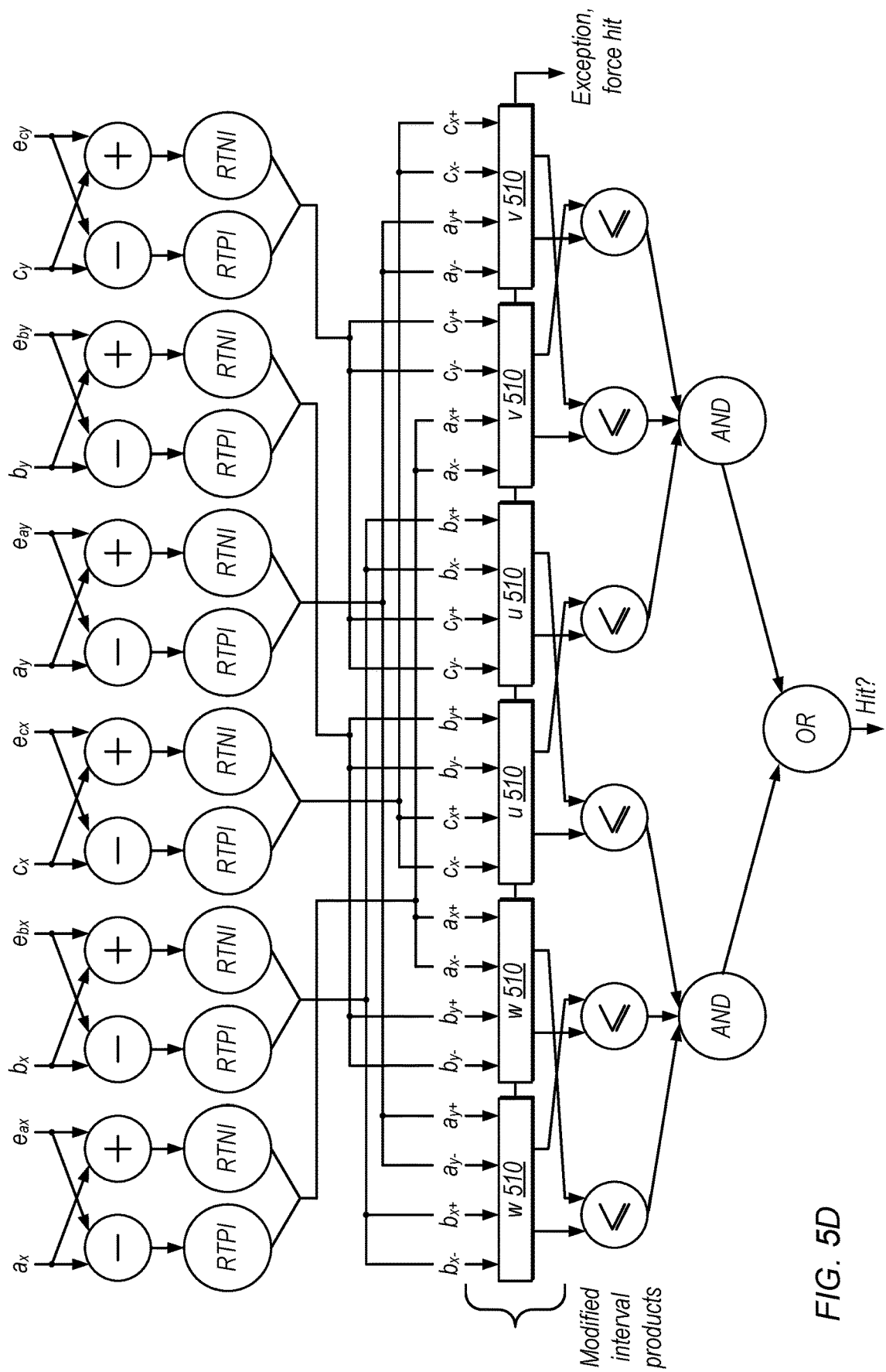

Edge test logic 460, in some embodiments, is configured to perform a number of edge tests to determine whether the reduced-precision intersection test indicates a conclusive miss. FIG. 5D provides one example of such circuitry. In this example, edge test logic 460 includes add, subtract, round toward positive infinity (RTPI), round toward negative infinity (RTNI), router circuitry, multiplier circuitry, compare circuitry, an AND gate, a NAND gate, and an OR gate.

In some embodiments, primitive data is quantized to share the same coordinate frame as bounding regions of an acceleration data structure traversed prior to primitive testing. In some embodiments, the coordinate frame may be thought of as uniformly spaced Cartesian voxel grid with an explicitly encoded origin, and three IEEE-biased 8b exponents which define the scale of the voxel grid relative to object-space. The following discussion uses such an 8-bit representation for quantization of triangle data, but various other post-quantization encodings may be implemented in other embodiments.

The following description sets out more detailed example operations performed by these units in example embodiments. This detailed example is included for purposes of explanation, but is not intended to limit the scope of the present disclosure. In other embodiments, any of various appropriate calculations, number representations, etc. may be implemented.

To facilitate understanding, the following convention has been used in most of the discussion below. Capital symbols are in object-space, lower case symbols are in fixed-point quantization space, and primed lower-case symbols are in fixed-point sheared space.

Vectors are barred, e.g.: $\bar{x}$

Object-space quantities are upper case

Quantization-space quantities are lower case

Sheared quantization-space quantities are lower case primed, e.g.: x'

Subscripts are used to denote coordinate axes, e.g.: $T_i \forall i \in \{x,y,z\}$ The convention a.b.c for floating-point representations refers to number of sign bits (a), exponent bits (b), and mantissa bits (c)

The convention x.y for fixed-point representations refers to the number of integer bits (x) and fraction bits (y)

The mathematical operator "fixed x.y" denotes a rounded conversion to an x.y fixed-point representation of x integer bits and y fractional bits P ray origin, floating-point object-space p' ray origin propagated along the ray to a location near the quantization frame, floating-point object-space $\bar{D}$ ray direction, floating-point object-space t approximate ray parameter giving a point along the ray as near the quantization frame as can be ascertained $T^v$ triangle vertex coordinates, floating-point object-space (v indexes the three vertices)

N quantization frame origin, floating-point object-space

S quantization frame scale factor(s), exact power of two $t^v$ triangle vertex coordinates, fixed-point quantization space p ray origin, fixed-point quantization space In some embodiments, the transform to 2D sheared space is given by:

$$\begin{bmatrix} t'_x \\ t'_y \end{bmatrix} = \begin{bmatrix} 1 & 0 & -\frac{d_x}{d_z} & 0 \\ 0 & 1 & -\frac{d_y}{d_z} & 0 \end{bmatrix} \begin{bmatrix} 1 & 0 & 0 & -p_x \\ 0 & 1 & 0 & -p_y \\ 0 & 0 & 1 & -p_z \\ 0 & 0 & 0 & 1 \end{bmatrix} \begin{bmatrix} t_x \\ t_y \\ t_z \\ 1 \end{bmatrix} \quad (1)$$

$$= \begin{bmatrix} (t_x - p_x) - \frac{d_x}{d_z}(t_z - p_z) \\ (t_y - p_y) - \frac{d_y}{d_z}(t_z - p_z) \end{bmatrix}$$

In order to perform these calculations with fixed-point arithmetic, the device may convert object-space ray quantities P and D into quantization-space p and d as follows:

$$p = \frac{P_{t,i} - N_i}{S_i} = \frac{(P_i + tD_i) - N_i}{S_i} \forall i \in \{x, y, z\} \quad (2)$$

$$d_i = \frac{D_i}{S_i} \forall i \in \{x, y, z\} \quad (3)$$

In some embodiments, ray quantization circuitry 410 is configured to perform these operations.

Before proceeding further, the device may establish which axis of the scaled ray direction has the largest magnitude and rotate the axis names so that the longest axis is in the third place ("z"). Further, if this direction component is negative, the device may swap the other two axes in order to preserve handedness. For the following discussion, assume this renaming has been applied to all Cartesian quantities. This renaming is performed in the "axis rename" blocks of FIG. 5A, for example.

Substituting back into Equation 1 and simplifying gives:

$$\begin{bmatrix} t'_x \\ t'_y \end{bmatrix} = \begin{bmatrix} (t_x - p_x) - \frac{d_x}{d_z}(t_z - p_z) \\ (t_y - p_y) - \frac{d_y}{d_z}(t_z - p_z) \end{bmatrix} = \quad (4)$$

$$\begin{bmatrix} \left(t_x - \frac{(P_x + tD_x) - N_x}{S_x}\right) - \frac{D_x S_z}{D_z S_x}\left(t_z - \frac{(P_z + tD_z) - N_z}{S_z}\right) \\ \left(t_y - \frac{(P_y + tD_y) - N_y}{S_y}\right) - \frac{D_y S_z}{D_z S_y}\left(t_z - \frac{(P_z + tD_z) - N_z}{S_z}\right) \end{bmatrix}$$

FIG. 5B provides example circuitry configured to implement operations corresponding to equation 4 to generate translated and sheared vertices.

Once in 2D shear-space, the ray position reduces to the origin of this coordinate frame, its direction aligned with the z axis, which the device may test against the three directed edges of the 2D triangle represented by the three sheared coordinates t'∈{A', B', C'}, according to the following:

$$u = A'_x \cdot B'_y - A'_y \cdot B'_x$$

$$v = B'_x \cdot C'_y - B'_y \cdot C'_x$$

$$w = C'_x \cdot A'_y - C'_y \cdot A'_x$$

If all of u, v, w have the same sign, then the triangle covers the origin and the ray intersects the triangle, to within numerical precision. FIG. 5D provides example circuitry configured to perform operations corresponding to the above equations for u, v, w to generate an intersect result. Note that the circuitry of FIG. 5D has some differences relative to this equation. First, this circuitry performs a comparison instead of a subtraction (e.g., $A'_x \cdot B'_y < A'_y \cdot B'_x$ instead of $A'_x \cdot B'_y - A'_y \cdot B'_x$) because the sign is all that is needed. Second, the circuitry of FIG. 5D performs twice as many multiplies, in the illustrated embodiment, to provide a conservative test (e.g., only considering the "outer" part of the edge interval defined by the margin of error) but the circuitry does not know which way is "out" because it may be considering the clockwise or counter-clockwise face of the triangle. The addition, rounding, and routing logic of FIG. 5D may resolve which input values will provide two conservative point-in-triangle tests.

Thus, in some embodiments, the device computes the error bounds for $t'_i$ in Equation 4. Because operations involving only fixed-point quantities may incur no round-off error, the task is a matter of establishing the absolute error for $t_i$, $p_i$, $d_i$, and propagating that error through to the products in the equations for u, v, w above.

Triangle Vertex Component Quantization Error

The quantized triangle coordinates are given by the following equation:

$$t_i = \text{fixed}^{8.1}\left(\left\lfloor \frac{(T_i - N_i)}{S_i} \right\rfloor + 0.5 - 64\right) \quad (5)$$

Where T_i represents the original object-space triangle coordinates, N_i is the origin of the quantization frame, and S_i is the quantization frame scale factor. In some embodiments, the "coord adjust" circle of FIG. 5A is configured to perform some of the operations associated with equation (5). In particular, the sub-expression denoted by the floor operation may be precomputed and stored in a small number of bits. For the rest of this discussion, we will assume a 7b storage format, though some implementations may store more or fewer bits left of the binary point. The addition of 0.5 to this quantity is implemented by appending a single implicit fractional bit, giving a fixed point 7.1 format. Finally, the unsigned value is de-biased by translating 64 units, to move the coordinate origin to the center (rather than the lower corner) of the quantization frame.

This coordinate may have a worst case absolute error of 0.5 (0×1).

$$\delta_{t_i} = 0.5 \quad (6)$$

Ray Position Error

In some embodiments, the quantized fixed-point ray position is obtained according to the following equations:

$$p_x = \text{fixed}^{8.9}\left(\frac{P_{t,i} - N_i}{S_i}\right) - 64.0$$

$$p_y = \text{fixed}^{8.9}\left(\frac{P_{t,i} - N_i}{S_i}\right) - 64.0$$

$$p_z = \text{fixed}^{8.1}\left(\frac{P_{t,i} - N_i}{S_i}\right) - 64.0$$

Where $P_{t,i} = P_i + tD_i$

Note that while the algebra is the same, z is computed with lower precision in this example. The operations prior to fixed-point conversion are floating-point and may incur roundoff error. The following equations provide the absolute error $\delta_{p_i}$:

$$p_x \pm \delta_{p_x} = \text{fixed}^{8.9}\left(\frac{(P_{t,i}(1 \pm \epsilon_0) - N_x)(1 \pm \epsilon_1)}{S_x}\right) - 64.0 \pm 2^{-10}$$

$$= \text{fixed}^{8.9}\left(\frac{(P_{t,i} - N_x \pm |P_{t,i}|\epsilon_0)(1 \pm \epsilon_1)}{S_x}\right) - 64.0 \pm 2^{-10}$$

$$= \text{fixed}^{8.9}\left(\frac{(P_{t,i} - N_x \pm (|P_{t,i}|(\epsilon_0 + \epsilon_0\epsilon_1) + |P_{t,i} - N_x|\epsilon_1)}{S_x}\right) - 64.0 \pm 2^{-10}$$

$$= \text{fixed}^{8.9}\left(\frac{(P_{t,i} - N_x)}{S_x}\right) - 64.0 \pm 2^{-10} + \frac{|P_{t,i}|(\epsilon_0 + \epsilon_0\epsilon_1) + |P_{t,i} - N_x|\epsilon_1}{S_x}$$

$$\delta_{p_x} = 2^{-10} + \frac{|P_{t,i}|(\epsilon_0 + \epsilon_0\epsilon_1) + |P_{t,i} - N_x|\epsilon_1}{S_x}$$

Note that $S_i$ is an exact power of two (represented exactly) and the subtraction of 64.0 is exact fixed-point arithmetic. In some embodiments, hardware rounds the fused multiply-add (FMA) result to the nearest 16b mantissa, and the subtraction is rounded to the nearest 7b mantissa, giving $\epsilon_0=2^{-17}$ and $\epsilon_1=2^{-8}$. To simplify the circuitry, in some embodiments, the substitution $2\epsilon_0 > \epsilon_0 + \epsilon_0\epsilon_1$ is made. This produces the following derivations for the absolute error for all three ray position coordinates (note the differing constant term for $\delta_{p_z}$):

$$\delta_{p_x} = 2^{-10} + \frac{1}{S_x}(2^{-16}|P_{t,x}| + 2^{-8}|P_{t,x} - N_x|) \quad (7)$$

$$\delta_{p_y} = 2^{-10} + \frac{1}{S_y}(2^{-16}|P_{t,y}| + 2^{-8}|P_{t,y} - N_y|) \quad (8)$$

$$\delta_{p_z} = 2^{-2} + \frac{1}{S_z}(2^{-16}|P_{t,z}| + 2^{-8}|P_{t,z} - N_z|) \quad (9)$$

The upper-left hand portion of FIG. 5C provides example circuitry configured to determine these errors, in some embodiments.

Shear Coefficient Error and Shear Equation With Error Terms

In some embodiments, the fixed-point shear coefficients $$\frac{d_x}{d_z} \text{ and } \frac{d_y}{d_z}$$

are calculated using a correctly-rounded low precision floating-point reciprocal, followed by a nearest conversion to fixed-point representation. The rounding error introduced by these operations are bounded by:

$$\frac{d_i}{d_z} \pm \delta_{sh_i} = \text{fixed}^{1.8}\left(\frac{D_i S_z}{D_z S_i}(1 \pm 2^{-11})\right) \pm 2^{-9} \quad (10)$$

$$= \text{fixed}^{1.8}\left(\frac{D_i S_z}{D_z S_i} \pm 2^{-11}\left|\frac{D_i S_z}{D_z S_i}\right|\right) \pm 2^{-9}$$

$$= \text{fixed}^{1.8}\left(\frac{D_i S_z}{D_z S_i}\right) \pm \left(2^{-11}\left|\frac{D_i S_z}{D_z S_i}\right| \pm 2^{-9}\right)$$

$$\delta_{sh_i} = 2^{-11}\left|\frac{d_i}{d_z}\right| + 2^{-9}$$

Re-assembling equation 4 with the absolute error intervals from Equations 6-10 and simplifying gives an absolute error expression for the 2D sheared vertex coordinates $t' \in \{A', B', C'\}$:

$$t'_i = \delta_{t'_i} = ((t_i \pm \delta_{t_i}) - (p_i \pm \delta_{p_i})) - \left(\frac{d_i}{d_z} \pm \delta_{sh_i}\right)((t_z \pm \delta_{t_z}) - (p_z \pm \delta_{p_z})) \quad (11)$$

$$= (t_i - p_i \pm (\delta_{t_i} + \delta_{p_i})) - \left(\frac{d_i}{d_z} \pm \delta_{sh_i}\right)(t_z - p_z \pm (\delta_{t_z} + \delta_{p_z}))$$

$$= (t_i - p_i) - \frac{d_i}{d_z}(t_z - p_z) \pm$$

$$\left(\delta_{t_i} + \delta_{p_i} + \delta_{sh_i}|t_z - p_z| + (\delta_{t_z} + \delta_{p_z})\left|\frac{d_i}{d_z}\right| + \delta_{sh_i}(\delta_{t_z} + \delta_{p_z})\right)\delta_{t'_i}$$

$$= \delta_{t_i} + \delta_{p_i} + \delta_{sh_i}|t_z - p_z| + (\delta_{t_z} + \delta_{p_z})\left|\frac{d_i}{d_z}\right| + \delta_{sh_i}(\delta_{t_z} + \delta_{p_z})$$

$$= \delta_{t_i} + \delta_{p_i} + \delta_{sh_i}|t_z - p_z|a + (\delta_{t_z} + \delta_{p_z})\left|\frac{d_i}{d_z}\right| + \delta_{sh_i}$$

To reduce the costs of calculating expression (11), embodiments may employ simplifying substitutions and further reduced precision, while still producing a result greater than or equal to this error bounds. For example, writing out all terms, then grouping the constant coefficients, then making substitutions (12) and (13):

$$\epsilon_P^i = 2^{-16}|P_{t,z}| + 2^{-8}|P_{t,z} - N_z| \quad (12)$$

$$\Delta z = |t_z - p_z| \quad (13)$$

With that, we can re-write equation 11 using equations 6-10, simplify to a handful of terms, then group $\Delta z$ and $$\frac{\epsilon_P^z}{S_z}$$

terms.

$$\delta_{t'_i} = \frac{513}{1024} + \frac{\epsilon_P^i}{S_x} + \left(2^{-11}\left|\frac{d_i}{d_z}\right| + 2^{-9}\right)\Delta z +$$

$$\left(0.75 + \frac{\epsilon_P^z}{S_z}\right)\left(\left|\frac{d_i}{d_z}\right| + 2^{-11}\left|\frac{d_i}{d_z}\right| + 2^{-9}\right)$$

$$= \frac{1029}{2048} + \frac{\epsilon_P^i}{S_i} + \frac{\Delta z}{2048}\left|\frac{d_i}{d_z}\right| + \frac{\Delta z}{512} + \frac{6147}{8192}\left|\frac{d_i}{d_z}\right| +$$

$$\frac{1}{512}\frac{\epsilon_P^z}{S_\gamma} + \frac{2049}{2048}\left|\frac{d_i}{d_z}\right|\frac{\epsilon_P^z}{S_\gamma}$$

$$= \frac{1029}{2048} + \frac{\epsilon_P^i}{S_i} + \Delta_z\left(\left|\frac{d_i}{d_z}\right| + \frac{1}{2048} + \frac{1}{512}\right) + \frac{6147}{8192}\left|\frac{d_i}{d_z}\right| +$$

$$\frac{\epsilon_P^z}{S_z}\left(\frac{1}{512} + \frac{2049}{2048}\left|\frac{d_i}{d_z}\right|\right)$$

In some embodiments, $$\left|\frac{d_i}{d_z}\right| \leq 1$$

due to the axis-renaming logic which ensures the constraint $|D_i S_z| \leq |D_z S_k|$. Therefore this factor can be eliminated where its coefficient is insignificant. Rounding up to 1 may also allow dropping a multiplier. These example choices simplify the equation to:

$$\delta_{t_i'} \le \frac{1029}{2048} + \frac{5}{2048}\Delta_z + \left|\frac{d_i}{d_z}\right| + \frac{\epsilon_P^i}{S_i} + \frac{\epsilon_P^z}{S_z}\frac{2053}{2048} \quad (14)$$

The terms $$\left|\frac{d_i}{d_z}\right|$$

and $\Delta_z$ are already available in fixed-point 1.12 and 9.1 formats respectively, in the illustrated example. In some embodiments, the circuitry computes the ray-position-derived error terms in bfloat16 format, then converts to 1.12 fixed-point, then sums all the terms with 12b fixed-point fractional precision. Furthermore, in this example only the term $\Delta_z$ is unique to each vertex. All operations here that involve rounding may round up (towards positive infinity).

$$E_0^x = \frac{1029}{2048} + \left|\frac{d_x}{d_z}\right| + fixed^{10.12}\left(\frac{\epsilon_P^z}{S_z}\frac{2053}{2048}\frac{\epsilon_P^x}{S_x}\right)$$

$$E_0^y = \frac{1029}{2048} + \left|\frac{d_y}{d_z}\right| + fixed^{10.12}\left(\frac{\epsilon_P^z}{S_z}\frac{2053}{2048}\frac{\epsilon_P^y}{S_y}\right)$$

$$\delta_{t_x'}^A = E_0^x + \Delta_z^A$$

$$\delta_{t_y'}^A = E_0^x + \Delta_z^A$$

$$\delta_{t_x'}^B = E_0^x + \Delta_z^B$$

$$\delta_{t_y'}^B = E_0^x + \Delta_z^B$$

$$\delta_{t_x'}^C = E_0^x + \Delta_z^C$$

$$\delta_{t_y'}^C = E_0^x + \Delta_z^C$$

FIG. 5C provides an example of circuitry configured to perform these operations to generate error bounds.

Two-Sided Conservative Edge Tests

After calculating approximate fixed-point sheared 2D vertex coordinates, the circuitry calculates, conservatively, whether the origin of this 2D coordinate frame is inside or outside the triangle edges. Recall that the origin represents the ray, post-transformation. An exact origin-in-triangle test takes the form of the equations for u, v, w above and is true if all of u, v, w have the same sign (negative for "back" face, positive for "front" face). However, in implementations without exact values at this point, the following interval edge tests may provide a conservative test:

$$u \pm \delta_U = (A'_x \pm \delta_{t_x'}^A) \cdot (B'_y \pm \delta_{t_y'}^B) - (A'_y \pm \delta_{t_y'}^A) \cdot (B'_x \pm \delta_{t_x'}^B) \quad (15)$$

$$v \pm \delta_V = (B'_x \pm \delta_{t_x'}^B) \cdot (C'_y \pm \delta_{t_y'}^C) - (B'_y \pm \delta_{t_y'}^B) \cdot (C'_x \pm \delta_{t_x'}^C) \quad (16)$$

$$w \pm \delta_W = (C'_x \pm \delta_{t_x'}^C) \cdot (A'_y \pm \delta_{t_y'}^A) - (C'_y \pm \delta_{t_y'}^C) \cdot (A'_x \pm \delta_{t_x'}^A) \quad (17)$$

This may use six signed interval sum-of-product operations. Instead of calculating the u, v, w, and intervals directly, the circuitry may need only to conservatively estimate their signs. If all three intervals (both upper and lower values) have the same sign, then there is the possibility of a hit. Otherwise, a miss can be guaranteed.

Normally a signed interval product requires four multipliers, as it is defined: $[x_1, x_2] \cdot [y_1, y_2] = [\min(x_1y_1, x_1y_2, x_2y_1, x_2y_2), \max(x_1y_1, x_1y_2, x_2y_1, x_2y_2)]$ In some embodiments, the interval product is implemented using two multipliers.

To fully resolve the sign of the interval sum-of-products, we need to accurately resolve the sign of both endpoints to each interval product. This can be done with only two multipliers per interval product, except when both interval inputs to the interval product span the origin. In this instance, the hardware may raise an exception, and the intersection test may record a potential hit. Empirical data shows this is exception case may be rare under typical workloads. Code Listing 1 implements a modified signed interval product using only two hardware multipliers. Code Listing 2 implements example edge testing code.

```
// Begin Code Listing 1: Modified Signed Interval Product
template <typename T>
struct Interval {
    T lower, upper;
    inline Interval (const T& l, const T& u) : lower(l),
        upper(u) { }
};
// T is assumed to be a signed integer (int8_t, int16_t,
    int32_t, int64_t)
// Exception is raised in the case where four multipliers
    are needed to resolve
// the sign of both end points of the interval - in all
    other cases signs are
// fully resolved.
template <typename T>
Interval<T> intervalProduct (Interval<T> a, Interval<T> b,
    bool& exception) {
    uint8_t bit0_AB = a.upper >= 0;
    uint8_t bit1_AB = a.lower >= 0;
    uint8_t bit2_AB = b.upper >= 0;
    uint8_t bit3_AB = b.lower >= 0;
    uint8_t code_AB = (bit3_AB << 3) | (bit2_AB << 2) |
        (bit1_AB << 1) | bit0_AB;
    Interval<T> p = { 0, 0 };
    switch (code_AB) {
        case 0xf: p.upper = a.upper * b.upper; p.lower =
            a.lower * b.lower; break;
        case 0xd: p.upper = a.upper * b.upper; p.lower =
            a.lower * b.upper; break;
        case 0xc: p.upper = a.upper * b.lower; p.lower =
            a.lower * b.upper; break;
        case 0x7: p.upper = a.upper * b.upper; p.lower =
            a.upper * b.lower; break;
        case 0x5:
            p.upper = std::numeric_limits<T>::max( );
            p.lower = std::numeric_limits<T>::lowest( );
            exception = true;
            break; // failure case - too close to call, need 4
                multipliers
        case 0x4: p.upper = a.lower * b.lower; p.lower =
            a.lower * b.upper; break;
        case 0x3: p.upper = a.lower * b.upper; p.lower =
            a.upper * b.lower; break;
        case 0x1: p.upper = a.lower * b.lower; p.lower =
            a.upper * b.lower; break;
        case 0x0: p.upper = a.lower * b.lower; p.lower =
            a.upper * b.upper; break;
    }
    return p;
}
```

FIG. 5E shows one example of circuitry 510 configured to implement the modified signed interval product, according to some embodiments. In this embodiment, the routing circuitry 520 is configured by the four signs of the inputs to route operands to two multipliers. Circuitry 520 is also configured to detect an exception condition, in this example.

```
// Begin Code Listing 2: Conservative Two-Sided Edge Tests
// Each intervalProduct is 2x signed 11.4b * 11.4b = 22.8b
    products
Interval W_bx_ay = intervalProduct(bxInterval, ayInterval,
```

-continued

```
        exception);
    Interval W_by_ax = intervalProduct(byInterval, axInterval,
        exception);
    Interval U_cx_by = intervalProduct(cxInterval, byInterval,
        exception);
    Interval U_cy_bx = intervalProduct(cyInterval, bxInterval,
        exception);
    Interval V_ax_cy = intervalProduct(axInterval, cyInterval,
        exception);
    Interval V_ay_cx = intervalProduct(ayInterval, cxInterval,
        exception);
    const bool edgeTestSignsFrontU = U_ cx_by.upper >=
        U_cy_bx.lower; // U > 0
    const bool edgeTestSignsFrontV = V_ ax_cy.upper >=
        V_ay_cx.lower; // V > 0
    const bool edgeTestSignsFrontW = W_ bx_ay.upper >=
        W_by_ax.lower; // W > 0
    const bool edgeTestSignsBackU = U_ cx_by.lower <=
        U_cy_bx.upper; // U < 0
    const bool edgeTestSignsBackV = V_ax_cy.lower <=
        V_ay_cx.upper; // V < 0
    const bool edgeTestSignsBackW = W_bx_ay.lower <=
        W_by_ax.upper; // W < 0
    // handle back and front face possibilities
    bool hit =(edgeTestSignsBackU && edgeTestSignsBackV &&
        edgeTestSignsBackW) || (edgeTestSignsFrontU &&
        edgeTestSignsFrontV && edgeTestSignsFrontW);
// End Code Listing 2
```

FIG. 5D shows example circuitry configured to implement the operations of Code Listing 2. As shown, the translated and sheared vertices from FIG. 5B and the error bounds output from FIG. 5C are added and subtracted and then appropriately rounded to positive or negative infinity. The rounding results are routed to interval product circuitry 510, whose outputs are compared. The illustrated AND and OR logic then provides a hit result that indicates whether the reduced-precision test provides a conclusive miss.

Once common subexpressions are collected, the six two-sided edge tests may use 12 adders, 12 multipliers, and 6 comparators, all fixed-point, as shown in FIG. 5D. Note that various circuitry may be combined or merged, for example adders and subtractors may be implemented by a single component that performs both operations in parallel and multipliers and comparators may be merged to implement a single ab<cd operation. In the example of FIG. 5D, the router circuitry 510 routes rounding results to the appropriate multipliers, e.g., as set out in Code Listing 2 above.

In summary, FIGS. 5A-5E provide example circuitry configured to perform the operations represented by the various equations and pseudocode included above. This circuitry is included for purposes of illustration, but is not intended to limit the scope of the present disclosure. In other embodiments, various parameters may vary, including using: different formats, different precisions, different amounts of quantization, different techniques for conservatively estimating error, etc. While the circuitry of FIGS. 5A-5E may be advantageous in terms of speed, area, and power consumption in certain devices, other implementations are contemplated.

Example Storage of Quantized Primitives

As discussed above, a set of quantized values (e.g., for multiple primitives) may share a "quantization frame" that defines parameters for the values. In some embodiments, quantized values are represented as fixed-point offsets relative to a common origin and scale factor. Therefore, the quantization frame may specify the origin (e.g., in x, y, and z coordinates) and scale factors (e.g., as power-of-2 scale factors for each of the z, y, and z dimensions). The quantized primitives may discussed herein may be represented using fixed-point coordinates that are interpreted in the context of the quantization frame.

In some embodiments, similar quantization frames are used to represent bounding boxes in a bounding volume hierarchy (BVH) data structure that is traversed to determine which primitives to test for intersection. For example, each node in the data stricture may define the quantization frame for its child bounding boxes. In some embodiments, leaf nodes indicate primitives associated with the node, which the graphics processor may test if there is a hit in the corresponding bounding box.

In some embodiments, the graphics processor generates the BVH data structure and traverses the data structure during ray tracing operations. In some embodiments, the processor stores both quantized primitive data and original-precision primitive data in the same region of memory so that a single offset value encoded in a parent node of the BVH is sufficient to indicate all of the corresponding the primitive data. For example, the quantized primitive data may be stored immediately before or immediately after the original-precision primitive data.

Figure 6:
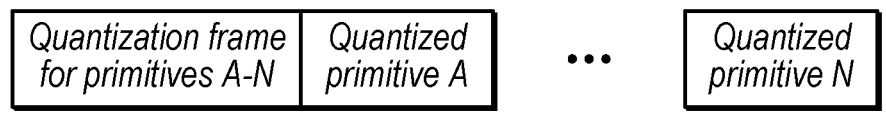
FIG. 6 is a block diagram illustrating an example cache-line-sized block of quantized primitive data, according to some embodiments.

In some embodiments, the graphics processor is configured to pack quantized primitives into cache-line sized blocks, along with quantization frame data for those primitives. In these embodiments, different cache lines may therefore have different values for quantization frame parameters. FIG. 6 is a block diagram illustrating an example cache-line-sized block of quantized primitive data, according to some embodiments. In the illustrated embodiment, a cache-line-sized block of data 610 includes quantized primitives A-N (e.g., quantized coordinates for primitive vertices) and a quantization frame for those primitives.

In these embodiments, the quantization frame may be customized for the triangles in that block, and thus may not match the quantization frame for the parent node of the primitives. This may advantageously allow construction of a tighter quantization frame for the limited number of triangles in a cache line, which may reduce precision loss associated with quantization. Further, this may allow the intersection circuitry to de-quantize primitives in a cache line without loading quantization frame data from another cache line, e.g., because the quantization frame data is already included in the accessed cache line. The improvements to cache efficiency and quantization frame fit may substantially outweigh any corresponding reduction in the number of primitives per cache line, in various implementations.

Example Method

Figure 7:
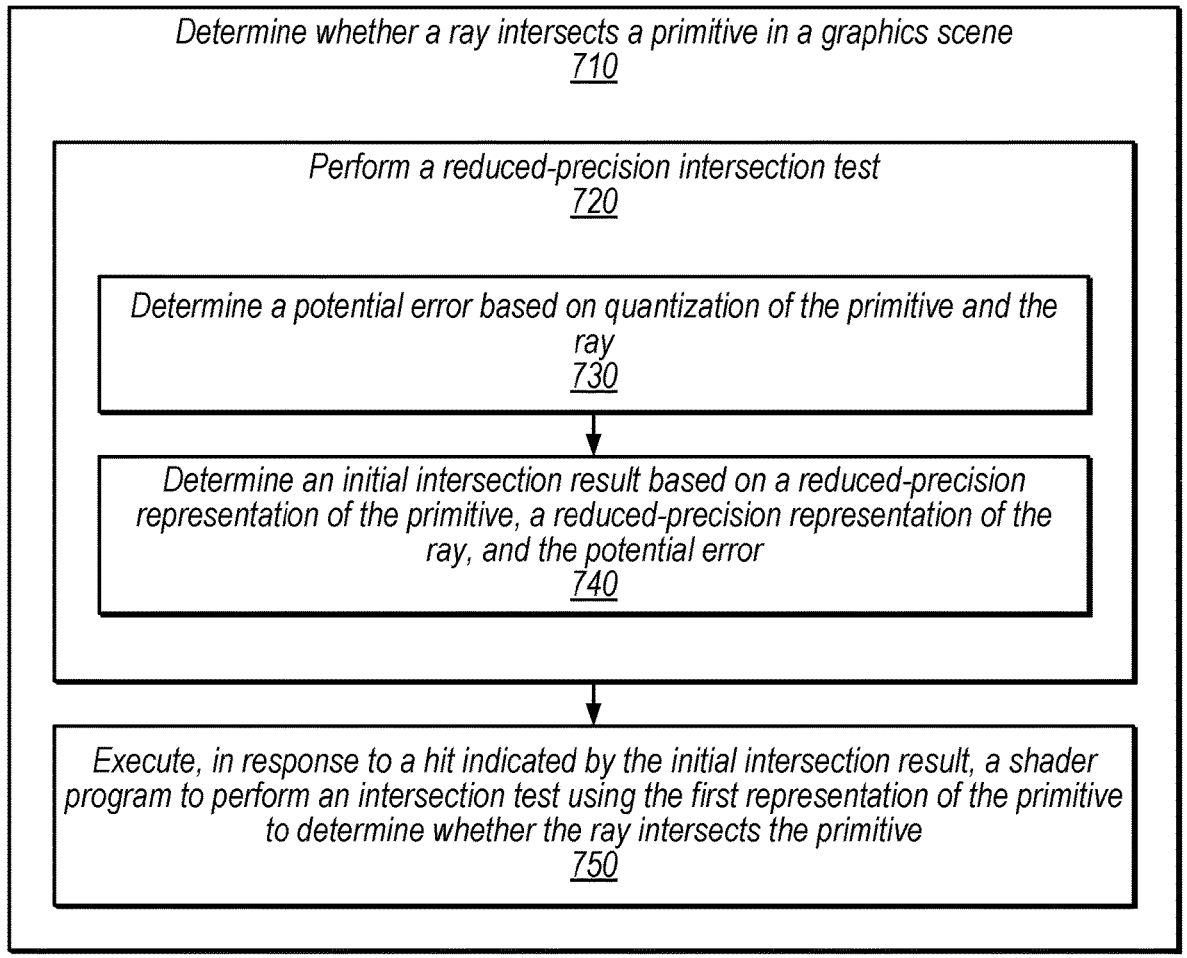
FIG. 7 is a flow diagram illustrating an example method for a multi-precision primitive intersection test, according to some embodiments.

FIG. 7 is a flow diagram illustrating an example method for a multi-precision primitive intersection test, according to some embodiments. The method shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 710, in the illustrated embodiment, a graphics processor determines whether a ray intersects a primitive in a graphics scene. In the illustrated embodiments, this includes both a reduced-precision intersection test and a higher-precision intersection test, as set out in elements 720-750.

At 720, in the illustrated embodiment, ray intersection circuitry performs a reduced-precision intersection test. In the illustrated embodiment, this includes elements 730 and 740.

At 730, in the illustrated embodiment, the ray intersection circuitry (e.g., error bounds calculation circuitry 450) determines a potential error based on quantization of the primitive and the ray. The quantization may have generated reduced-precision representations of the primitive and ray. In some embodiments, the method includes quantizing the ray, the primitive, or both. In some embodiments, the reduced-precision representations are fixed-point representations and the first representation is a floating-point representation.

In some embodiments, the ray intersection circuitry includes shear circuitry configured to shear coordinates of the reduced-precision representation of the primitive to a coordinate frame in which the ray originates at the origin. In some embodiments, the error bounds circuitry is configured to determine a portion of the potential error based on shear factors from the shear circuitry as an input signal. In some embodiments, the shear circuitry includes subtract circuitry configured to operate on quantized ray vertices and a quantized ray origin and multiplier circuitry configured to multiply results of the subtractions for a dimension by shear factors that are determined based on the ray direction.

In some embodiments, the error bounds circuitry is configured to determine a portion of the potential error based on one or more difference values (e.g., $\Delta z$ values) as an input signal, wherein the one or more difference values represent a difference between the value of a coordinate for an origin of the ray and the value of the coordinate for one or more vertices of the primitive. In some embodiments, the error bounds circuitry is configured to determine a portion of the error associated with quantization of the ray based on the ray origin and a quantization frame scale factor.

In some embodiments, the reduced-precision representation of the primitive is stored in a cache-line-sized block of data that includes multiple other primitives that share the same quantization frame. In some embodiments, the block of data also includes quantization frame information that specifies origin and scale factor information for the quantized primitives in the cache-line-sized block. In some embodiments, the processors generates the cache-line-sized block of data as part of a bounding volume hierarchy (BVH) data structure for traversal to determine which reduced-representation primitives to test for intersection.

At 740, in the illustrated embodiment, the ray intersection circuitry determines an initial intersection result based on the reduced-precision representations of the primitive and ray and based on the potential error. In some embodiments, the initial intersection result is a conservative intersection result.

In some embodiments, the ray intersection circuitry includes ray quantization circuitry (e.g., circuitry 410) configured to quantize a first representation of the ray to generate a reduced-precision representation of the ray.

In some embodiments, the ray intersection circuitry includes edge test logic configured to determine the initial intersection result. The edge test logic may both add and subtract the determined potential error value from coordinates for vertices of the reduced-precision representation of the primitive in order to provide results for multiple potential facing directions of the primitive. The edge test logic may include: adder circuitry configured to add error values to sheared primitive vertices, subtract circuitry configured to subtract error values from sheared primitive vertices, rounding circuitry configured to round addition and subtraction results, multiplier circuitry configured to multiply rounded results, router circuitry configured to route rounding results to the multiplier circuitry, compare circuitry configured to compare multiplier results, and logic configured to generate an intersection result based on comparison results.

In some embodiments, the ray intersection circuitry includes axis renaming circuitry configured to rename one or more axes based on an axis with a largest-magnitude of ray direction.

At 750, in the illustrated embodiment, shader circuitry executes, in response to a hit indicated by the initial intersection result, a shader program to perform an intersection test using the first representation of the primitive to determine whether the ray intersects the primitive. For example, RIA 190 may dynamically form a SIMD group to perform an original-precision intersection test for a set of one or more rays that are indicated as hits by the reduced-precision intersection test.

Example Device

Referring now to FIG. 8, a block diagram illustrating an example embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820 input/output (I/O) bridge 850, cache/memory controller 845, graphics unit 875, and display unit 865. In some embodiments, device 800 may include other components (not shown) in addition to or in place of the illustrated components, such as video processor encoders and decoders, image processing or recognition elements, computer vision elements, etc.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and caches. For example, compute complex 820 may include 1, 2, or 4 processor cores, or any other suitable number. In one embodiment, cache 830 is a set associative L2 cache. In some embodiments, cores 835 and 840 may include internal instruction and data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions.

Cache/memory controller 845 may be configured to manage transfer of data between fabric 810 and one or more caches and memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches.

As used herein, the term "coupled to" may indicate one or more connections between elements, and a coupling may include intervening elements. For example, in FIG. 8, graphics unit 875 may be described as "coupled to" a memory through fabric 810 and cache/memory controller 845. In contrast, in the illustrated embodiment of FIG. 8, graphics unit 875 is "directly coupled" to fabric 810 because there are no intervening elements.

Graphics unit 875 may include one or more processors, e.g., one or more graphics processing units (GPU's). Graphics unit 875 may receive graphics-oriented instructions, such as OPENGL®, Metal, or DIRECT3D® instructions, for example. Graphics unit 875 may execute specialized GPU instructions or perform other operations based on the received graphics-oriented instructions. Graphics unit 875 may generally be configured to process large blocks of data in parallel and may build images in a frame buffer for output to a display, which may be included in the device or may be a separate device. Graphics unit 875 may include transform, lighting, triangle, and rendering engines in one or more graphics processing pipelines. Graphics unit 875 may output pixel information for display images. Graphics unit 875, in various embodiments, may include programmable shader circuitry which may include highly parallel execution cores configured to execute graphics programs, which may include pixel tasks, vertex tasks, and compute tasks (which may or may not be graphics-related).

In some embodiments, graphics unit 875 includes the circuitry discussed above with reference to FIGS. 2-5E. This may improve graphics quality, improve performance, reduce power consumption, etc. relative to traditional GPU implementations.

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and low-power always-on functionality, for example. I/O bridge 850 may also include interfaces such as pulse-width modulation (PWM), general-purpose input/output (GPIO), serial peripheral interface (SPI), and inter-integrated circuit (I2C), for example. Various types of peripherals and devices may be coupled to device 800 via I/O bridge 850.

In some embodiments, device 800 includes network interface circuitry (not explicitly shown), which may be connected to fabric 810 or I/O bridge 850. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 800 with connectivity to various types of other devices and networks.

Example Applications

Turning now to FIG. 9, various types of systems that may include any of the circuits, devices, or system discussed above. System or device 900, which may incorporate or otherwise utilize one or more of the techniques described herein, may be utilized in a wide range of areas. For example, system or device 900 may be utilized as part of the hardware of systems such as a desktop computer 910, laptop computer 920, tablet computer 930, cellular or mobile phone 940, or television 950 (or set-top box coupled to a television).

Similarly, disclosed elements may be utilized in a wearable device 960, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 900 may also be used in various other contexts. For example, system or device 900 may be utilized in the context of a server computer system, such as a dedicated server or on shared hardware that implements a cloud-based service 970. Still further, system or device 900 may be implemented in a wide range of specialized everyday devices, including devices 980 commonly found in the home such as refrigerators, thermostats, security cameras, etc. The interconnection of such devices is often referred to as the "Internet of Things" (IoT). Elements may also be implemented in various modes of transportation. For example, system or device 900 could be employed in the control systems, guidance systems, entertainment systems, etc. of various types of vehicles 990.

The applications illustrated in FIG. 9 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

FIG. 10 is a block diagram illustrating an example non-transitory computer-readable storage medium that stores circuit design information, according to some embodiments. In the illustrated embodiment semiconductor fabrication system 1020 is configured to process the design information 1015 stored on non-transitory computer-readable medium 1010 and fabricate integrated circuit 1030 based on the design information 1015.

Non-transitory computer-readable storage medium 1010, may comprise any of various appropriate types of memory devices or storage devices. Non-transitory computer-readable storage medium 1010 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof. Non-transitory computer-readable storage medium 1010 may include two or more memory mediums which may reside in different locations, e.g., in different computer systems that are connected over a network.

Design information 1015 may be specified using any of various appropriate computer languages, including hardware description languages such as, without limitation: VHDL, Verilog, SystemC, SystemVerilog, RHDL, M, MyHDL, etc. Design information 1015 may be usable by semiconductor fabrication system 1020 to fabricate at least a portion of integrated circuit 1030. The format of design information 1015 may be recognized by at least one semiconductor fabrication system 1020. In some embodiments, design information 1015 may also include one or more cell libraries which specify the synthesis, layout, or both of integrated circuit 1030. In some embodiments, the design information is specified in whole or in part in the form of a netlist that specifies cell library elements and their connectivity. Design information 1015, taken alone, may or may not include sufficient information for fabrication of a corresponding integrated circuit. For example, design information 1015 may specify the circuit elements to be fabricated but not their physical layout. In this case, design information 1015 may need to be combined with layout information to actually fabricate the specified circuitry.

Integrated circuit 1030 may, in various embodiments, include one or more custom macrocells, such as memories, analog or mixed-signal circuits, and the like. In such cases, design information 1015 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 is configured to operate according to a circuit design specified by design information 1015, which may include performing any of the functionality described herein. For example, integrated circuit 1030 may include any of various elements shown in FIGS. 2, 4, 5A-5E, 8, and 9. Further, integrated circuit 1030 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components. etc.) may be described or claimed as "configured" to perform one or more tasks or operations. This formulation [entity] configured to [perform one or more tasks] is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
 a graphics processor configured to determine whether a ray intersects a triangular primitive in a graphics scene, wherein the graphics processor includes:
  ray intersection circuitry configured to perform a reduced-precision intersection test, including to:
   determine, by error bounds circuitry, a potential error based on quantization of the primitive and the ray that generated reduced-precision representations relative to respective first representations; and
   perform a first ray-triangle intersection test, based on the potential error, to determine an initial intersection result that indicates whether a reduced-precision triangular representation of the primitive is intersected by a reduced-precision representation of the ray, wherein the reduced-precision triangular representation of the primitive includes reduced-precision values of coordinates for three vertices of the triangular primitive; and circuitry configured to, in response to a hit indicated by the initial intersection result, perform a second ray-triangle intersection test using the first representation of the primitive and the first representation of the ray to determine whether the ray intersects the primitive.

2. The apparatus of claim 1, wherein the ray intersection circuitry includes quantization circuitry configured to quantize the first representation of the ray to generate the reduced-precision representation of the ray.

3. The apparatus of claim 1, wherein the ray intersection circuitry includes:
shear circuitry configured to shear coordinates of the reduced-precision representation of the primitive to a coordinate frame in which the ray originates at an origin of the coordinate frame;
wherein the error bounds circuitry is configured to determine a portion of the potential error based on shear factors from the shear circuitry as an input signal.

4. The apparatus of claim 3, wherein the shear circuitry includes:
subtract circuitry configured to operate on quantized ray vertices and a quantized ray origin; and
multiplier circuitry configured to multiply results of subtraction by the subtract circuitry for a dimension by shear factors that are determined based on a direction of the ray.

5. The apparatus of claim 3, wherein the error bounds circuitry is configured to determine a portion of the potential error based on one or more difference values as an input signal, wherein the one or more difference values represent a difference between a value of a coordinate for an origin of the ray and a value of the coordinate for one or more vertices of the primitive.

6. The apparatus of claim 1, wherein the error bounds circuitry is configured to determine a portion of the error associated with quantization of the ray based on an origin of the ray and a quantization frame scale factor.

7. The apparatus of claim 1, wherein the ray intersection circuitry includes edge test logic configured to determine the initial intersection result, wherein the edge test logic includes:
adder circuitry configured to add error values to sheared primitive vertices;
subtract circuitry configured to subtract error values from sheared primitive vertices;
rounding circuitry configured to round addition and subtraction results;
multiplier circuitry configured to multiply rounded results;
router circuitry configured to route rounding results to the multiplier circuitry;
compare circuitry configured to compare multiplier results; and
logic configured to generate an intersection result based on comparison results.

8. The apparatus of claim 1, wherein the ray intersection circuitry includes edge test circuitry configured to both add and subtract the determined potential error from coordinates for vertices of the reduced-precision representation of the primitive in order to provide results for multiple potential facing directions of the primitive.

9. The apparatus of claim 1, wherein the reduced-precision representation of the primitive is a fixed-point representation and the first representation is a floating-point representation and wherein the initial intersection result is a conservative intersection result.

10. The apparatus of claim 1, wherein the ray intersection circuitry includes axis renaming circuitry configured to rename one or more axes based on an axis with a largest-magnitude of ray direction.

11. The apparatus of claim 1, wherein the reduced-precision representation of the primitive is stored in a cache-line-sized block of data that includes multiple other primitives that share the same quantization frame, along with quantization frame information that specifies origin and scale factor information for the quantized primitives in the cache-line-sized block.

12. The apparatus of claim 11, wherein the ray intersection circuitry is further configured to:
perform bounding region intersection tests for the ray and respective bounding regions of a bounding volume hierarchy, prior to a determination to perform the reduced-precision intersection test.

13. The apparatus of claim 1, wherein the apparatus is a computing device that further includes:
a central processing unit;
a display; and
network interface circuitry.

14. A method, comprising:
determining, by a graphics processor, whether a ray intersects a triangular primitive in a graphics scene, including:
performing, by ray intersection circuitry, a reduced-precision intersection test that includes:
determining, by error bounds circuitry, a potential error based on quantization of the primitive and the ray that generated reduced-precision representations relative to respective first representations; and
performing a first ray-triangle intersection test, based on the potential error, to determine an initial intersection result that indicates whether a reduced-precision triangular representation of the primitive is intersected by a reduced-precision representation of the ray, , wherein the reduced-precision triangular representation of the primitive includes reduced-precision values of coordinates for three vertices of the triangular primitive; and
performing, in response to a hit indicated by the initial intersection result, a second ray-triangle intersection test using the first representation of the primitive to determine whether the ray intersects the primitive.

15. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
a graphics processor configured to determine whether a ray intersects a triangular primitive in a graphics scene, wherein the graphics processor includes:
ray intersection circuitry configured to perform a reduced-precision intersection test, including to:
determine, by error bounds circuitry, a potential error based on quantization of the primitive and the ray that generated reduced-precision representations relative to respective first representations; and
perform a first ray-triangle intersection test, based on the potential error, to determine an initial intersection result that indicates whether a reduced-precision triangular representation of the primitive is intersected by a reduced-precision representation of the ray, wherein the reduced-precision triangular representation of the primitive includes reduced-precision values of coordinates for three vertices of the triangular primitive; and circuitry configured to, in response to a hit indicated by the initial intersection result, to perform a second ray-triangle intersection test using the first representation of the primitive and the first representation of the ray to determine whether the ray intersects the primitive.

16. The non-transitory computer readable storage medium of claim 15, wherein the ray intersection circuitry includes quantization circuitry configured to quantize the first representation of the ray to generate the reduced-precision representation of the ray.

17. The non-transitory computer readable storage medium of claim 15, wherein the ray intersection circuitry includes:
shear circuitry configured to shear coordinates of the reduced-precision representation of the primitive to a coordinate frame in which the ray originates at an origin of the coordinate frame;
wherein the error bounds circuitry is configured to determine a portion of the potential error based on shear factors from the shear circuitry as an input signal.

18. The non-transitory computer readable storage medium of claim 15, wherein the error bounds circuitry is configured to determine a portion of the error associated with quantization of the ray based on an origin of the ray and a quantization frame scale factor.

19. The non-transitory computer readable storage medium of claim 15, wherein the ray intersection circuitry includes edge test logic configured to determine the initial intersection result, wherein the edge test logic includes:
adder circuitry configured to add error values to sheared primitive vertices;
subtract circuitry configured to subtract error values from sheared primitive vertices;
rounding circuitry configured to round addition and subtraction results;
multiplier circuitry configured to multiply rounded results;
router circuitry configured to route rounding results to the multiplier circuitry;
compare circuitry configured to compare multiplier results; and
logic configured to generate an intersection result based on comparison results.

20. The non-transitory computer readable storage medium of claim 15, wherein the ray intersection circuitry includes edge test circuitry configured to both add and subtract the determined potential error from coordinates for vertices of the reduced-precision representation of the primitive in order to provide results for multiple potential facing directions of the primitive.

* * * * *

UNITED STATES PATENT AND TRADEMARK OFFICE
CERTIFICATE OF CORRECTION

PATENT NO. : 12,002,190 B2
APPLICATION NO. : 17/136542
DATED : June 4, 2024
INVENTOR(S) : Christopher A. Burns et al.

It is certified that error appears in the above-identified patent and that said Letters Patent is hereby corrected as shown below:

In the Claims

Column 28, Line 39, delete "ray, , wherein" and insert --ray, wherein--

Signed and Sealed this
Tenth Day of December, 2024

Katherine Kelly Vidal
*Director of the United States Patent and Trademark Office*